US012353523B2

(12) United States Patent
Hinohara et al.

(10) Patent No.: US 12,353,523 B2
(45) Date of Patent: *Jul. 8, 2025

(54) MANAGEMENT SYSTEM, COMMUNICATION SYSTEM, AND INFORMATION PROCESSING METHOD

(71) Applicant: Ricoh Company, Ltd., Tokyo (JP)

(72) Inventors: Hiroshi Hinohara, Kanagawa (JP); Hidekuni Annaka, Saitama (JP); Takeshi Homma, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/613,474

(22) Filed: Mar. 22, 2024

(65) Prior Publication Data
US 2024/0232300 A1 Jul. 11, 2024

Related U.S. Application Data

(62) Division of application No. 17/643,474, filed on Dec. 9, 2021, now Pat. No. 11,966,456.

(30) Foreign Application Priority Data

Mar. 23, 2021 (JP) ................. 2021-048495

(51) Int. Cl.
*G06F 21/31* (2013.01)
*G06F 21/10* (2013.01)
(Continued)

(52) U.S. Cl.
CPC ............ *G06F 21/121* (2013.01); *G06F 21/31* (2013.01); *G06F 21/78* (2013.01); *H04L 63/08* (2013.01);
(Continued)

(58) Field of Classification Search
CPC .......... H04L 63/10–102; H04L 67/125; G06F 21/1078; G06F 21/30–31; G06F 21/33;
(Continued)

(56) References Cited

U.S. PATENT DOCUMENTS 10,097,729 B1 10/2018 Brady
10,469,484 B1 11/2019 Chen et al.
(Continued)

FOREIGN PATENT DOCUMENTS

JP 2014-071494 4/2014
JP 2019-134399 8/2019
(Continued)

OTHER PUBLICATIONS

Japanese Office Action for 2021-048495 mailed on Oct. 8, 2024.
(Continued)

*Primary Examiner* — Boris D Grijalva Lobos
(74) *Attorney, Agent, or Firm* — IPUSA, PLLC

(57) ABSTRACT

A management system for managing an event executed between a communication terminal used by a user and one or more devices is provided. The management system includes circuitry to receive an operation request for a device of the one or more devices from the communication terminal. The circuitry generates operation information associated with operation identification information and access information. The operation identification information identifies a device operation corresponding to the operation request. The access information is associated with the user and used to access external storage. The circuitry uploads data acquired by the device according to the device operation to the external storage using the access information associated with the generated operation information.

5 Claims, 14 Drawing Sheets

(51) Int. Cl.
*G06F 21/12* (2013.01)
*G06F 21/78* (2013.01)
*H04L 9/40* (2022.01)
*H04L 67/125* (2022.01)
*H04N 7/18* (2006.01)

(52) U.S. Cl.
CPC ............ *H04L 63/10* (2013.01); *H04L 67/125* (2013.01); *H04N 7/181* (2013.01); *G06F 21/1078* (2023.08)

(58) Field of Classification Search
CPC ........ G06F 21/335; G06F 21/41; G06F 21/78; H04N 7/181
See application file for complete search history.

(56) References Cited

U.S. PATENT DOCUMENTS

| | | | |
|---|---|---|---|
| 11,356,430 | B1 | 6/2022 | Kapczynski et al. |
| 11,615,197 | B1 | 3/2023 | Hu et al. |
| 11,838,824 | B2 | 12/2023 | Klein et al. |
| 2005/0216580 | A1 | 9/2005 | Raji et al. |
| 2008/0120726 | A1 | 5/2008 | Tsunehiro et al. |
| 2009/0103129 | A1 | 4/2009 | Kurosawa |
| 2013/0332575 | A1 | 12/2013 | Song et al. |
| 2014/0223536 | A1* | 8/2014 | Matsushima ....... H04L 63/0227 709/217 |
| 2015/0350344 | A1* | 12/2015 | Sugimura ............... H04L 67/10 709/202 |
| 2016/0117340 | A1* | 4/2016 | Hayashi ................ G06F 16/185 707/792 |
| 2016/0134932 | A1 | 5/2016 | Karp et al. |
| 2017/0244695 | A1 | 8/2017 | Lund et al. |
| 2017/0346804 | A1 | 11/2017 | Beecham |
| 2018/0097682 | A1 | 4/2018 | Yoshida et al. |
| 2018/0098105 | A1 | 4/2018 | Morita et al. |
| 2018/0191787 | A1 | 7/2018 | Morita et al. |
| 2018/0227457 | A1 | 8/2018 | Morita et al. |
| 2018/0278692 | A1 | 9/2018 | Okayama et al. |
| 2019/0191198 | A1 | 6/2019 | Morita et al. |
| 2019/0235735 | A1 | 8/2019 | Toyota et al. |
| 2020/0186407 | A1 | 6/2020 | Morita et al. |
| 2020/0287878 | A1 | 9/2020 | Allen et al. |
| 2021/0026589 | A1 | 1/2021 | Morita et al. |
| 2022/0182388 | A1 | 6/2022 | Boodaei et al. |
| 2022/0309133 | A1* | 9/2022 | Hinohara ................ H04L 63/10 |

FOREIGN PATENT DOCUMENTS

| | | | | |
|---|---|---|---|---|
| WO | 2002/031701 | | 4/2002 | |
| WO | 2017/090185 | | 6/2017 | |
| WO | WO-2021231584 | A1 * | 11/2021 | ........... G05D 1/0038 |

OTHER PUBLICATIONS

U.S. Appl. No. 17/460,333, filed Aug. 30, 2021, Tomonori Aikawa, et al.
U.S. Appl. No. 17/469,886, filed Sep. 9, 2021, Kenichiro Morita, et al.
U.S. Appl. No. 17/480,159, filed Sep. 21, 2021, Hidekuni Annaka, et al.
U.S. Appl. No. 17/482,442, filed Sep. 23, 2021, Hidekuni Annaka, et al.
Extended European Search Report for 22155399.3 mailed on Aug. 1, 2022.

* cited by examiner

FIG. 3
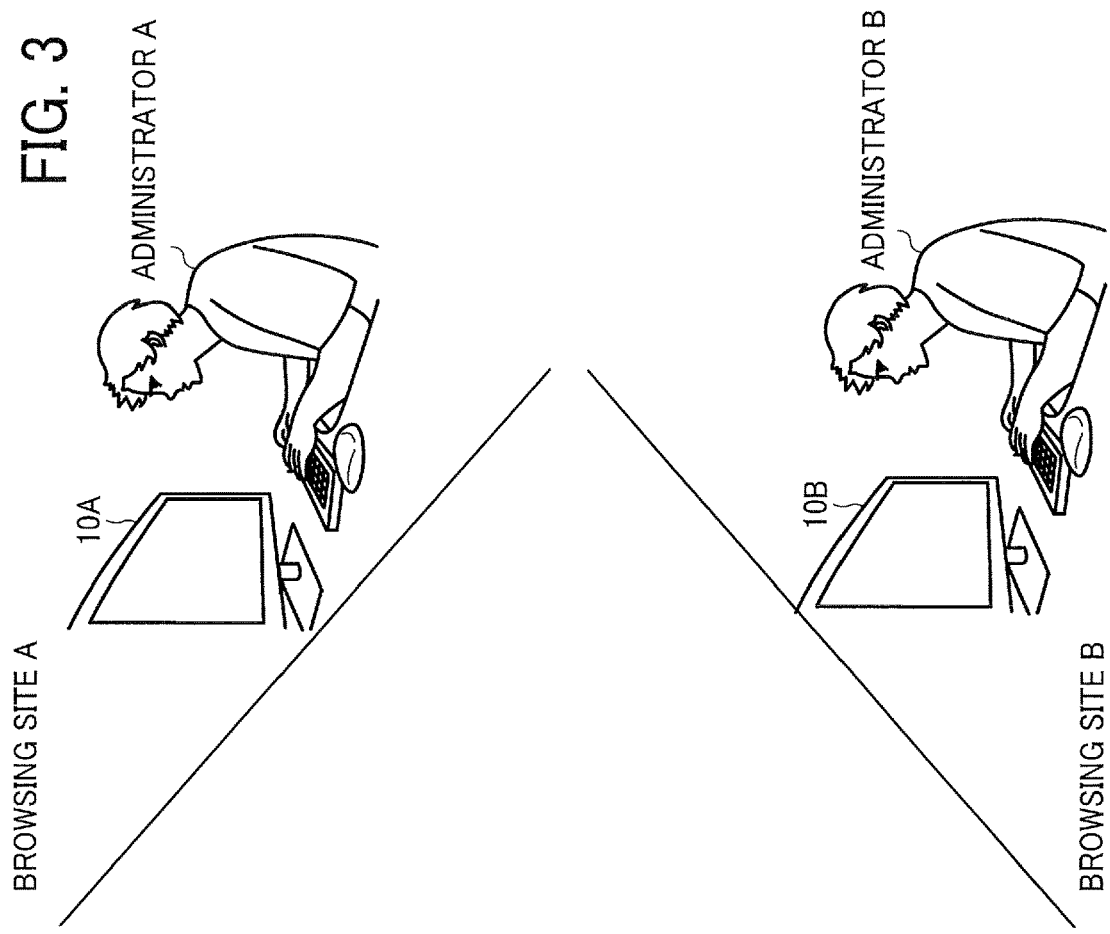
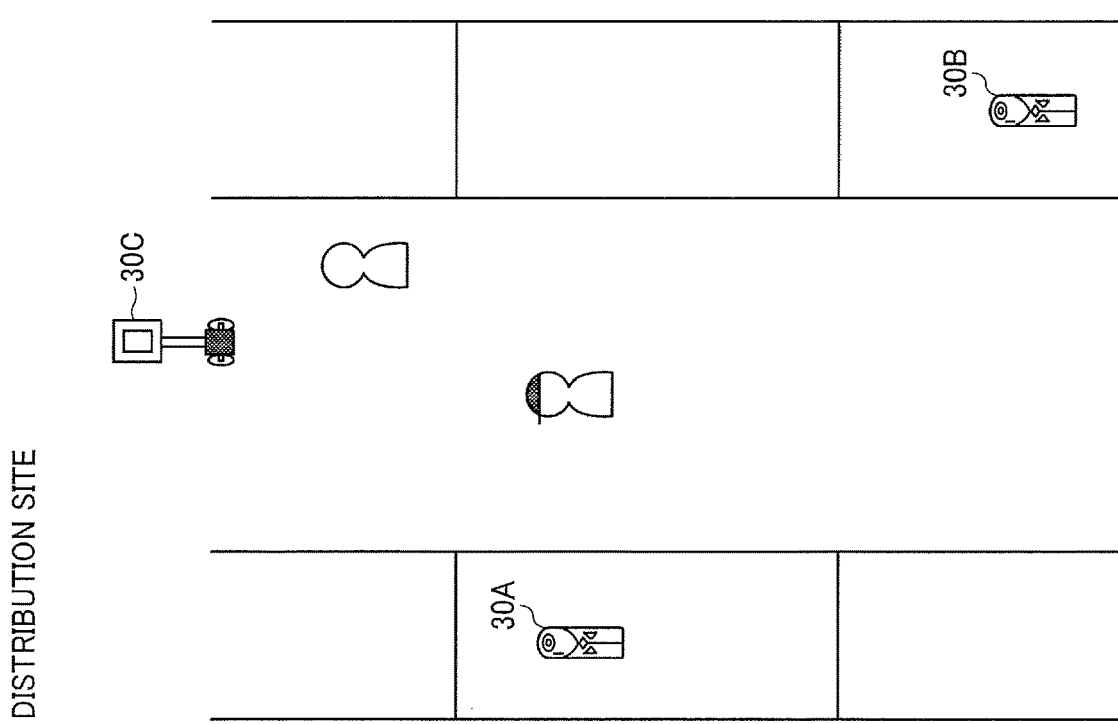

| USER ID | USER NAME | AUTHORIZATION TOKEN |
|---|---|---|
| A001 | Alice | eyJhbGc11··· |
| A002 | Mary | eyJhbGc12··· |
| A003 | John | − |
| A004 | Sato | eyJhbGc21··· |
| ... | ... | ... |

SITE ID; M001

| DEVICE ID | DEVICE NAME |
|---|---|
| D001 | deviceA |
| D002 | deviceB |
| D003 | deviceC |
| ... | ... |

| OPERATION ID | DEVICE ID | AUTHORIZATION TOKEN |
|---|---|---|
| ph001 | D001 | eyJhbGc11··· |

| USER ID | USER NAME | PASSWORD |
|---|---|---|
| A001 | Alice | a0101 |
| A002 | Mary | a0202 |
| A003 | John | a0303 |
| A004 | Sato | a0404 |
| ... | ... | ... |

MANAGEMENT SYSTEM, COMMUNICATION SYSTEM, AND INFORMATION PROCESSING METHOD

CROSS-REFERENCE TO RELATED APPLICATION

The present application is a divisional application of and claims the benefit of priority under 35 U.S.C. 120 of U.S. patent application Ser. No. 17/643,474 filed on Dec. 9, 2021, which is based on and claims priority to Japanese Patent Application No. 2021-048495, filed Mar. 23, 2021. The contents of all of the aforementioned applications are incorporated herein by reference in their entirety.

BACKGROUND

Technical Field

Embodiments of the present disclosure relate to a management system, a communication system, an information processing method, and a non-transitory recording medium.

Related Art

Known systems distribute a video image captured using an image capturing device, and a state of a site where the image capturing device is provided is viewable from other sites in real time.

In addition, techniques for storing, in an external storage service, data acquired by a device such as an image capturing device participating in a remote communication are known.

For example, a method of storing settings of an external storage service for each user in a server device and reading setting information stored in the server device by an electronic whiteboard, for a purpose of reducing time and effort for selecting an external storage service that is to be a transmission destination is known.

SUMMARY

An embodiment of the present disclosure includes a management system including circuitry to receive an operation request for a specific device of one or more devices from a communication terminal used by a user for who user authentication has been successfully performed by the management system. The one or more devices and the communication terminal are communicating with each other to execute an event managed by the management system. The circuitry stores, in a memory, operation identification information and access information in association with each other. The operation identification information identifies a device operation associated with the operation request. The access information is associated with the user and used to access external storage. The circuitry uploads data acquired by the specific device according to the device operation corresponding to the operation identification information to the external storage using the access information associated with the operation identification information.

An embodiment of the present disclosure includes an information processing method including receiving an operation request for a specific device of one or more devices from a communication terminal used by a user for who user authentication has been successfully performed by a management system. The one or more devices and the communication terminal are communicating with each other to execute an event managed by the management system. The method includes storing in a memory, operation identification information and access information in association with each other. The operation identification information identifies a device operation associated with the operation request. The access information is associated with the user and used to access external storage. The method includes uploading data acquired by the specific device according to the device operation corresponding to the operation identification information to the external storage using the access information associated with the operation identification information.

An embodiment of the present disclosure includes a non-transitory recording medium storing a plurality of instructions which, when executed by one or more processors, causes the processors to perform a method. The method includes receiving an operation request for a specific device of one or more devices from a communication terminal used by a user for who user authentication has been successfully performed by a management system. The one or more devices and the communication terminal are communicating with each other to execute an event managed by the management system. The method includes storing in a memory, operation identification information and access information in association with each other. The operation identification information identifies a device operation associated with the operation request. The access information is associated with the user and used to access external storage. The method includes uploading data acquired by the specific device according to the device operation corresponding to the operation identification information to the external storage using the access information associated with the operation identification information.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 3 is a diagram illustrating another example of overview of the communication system according to the one of the embodiments of the disclosure;

Figure 1:
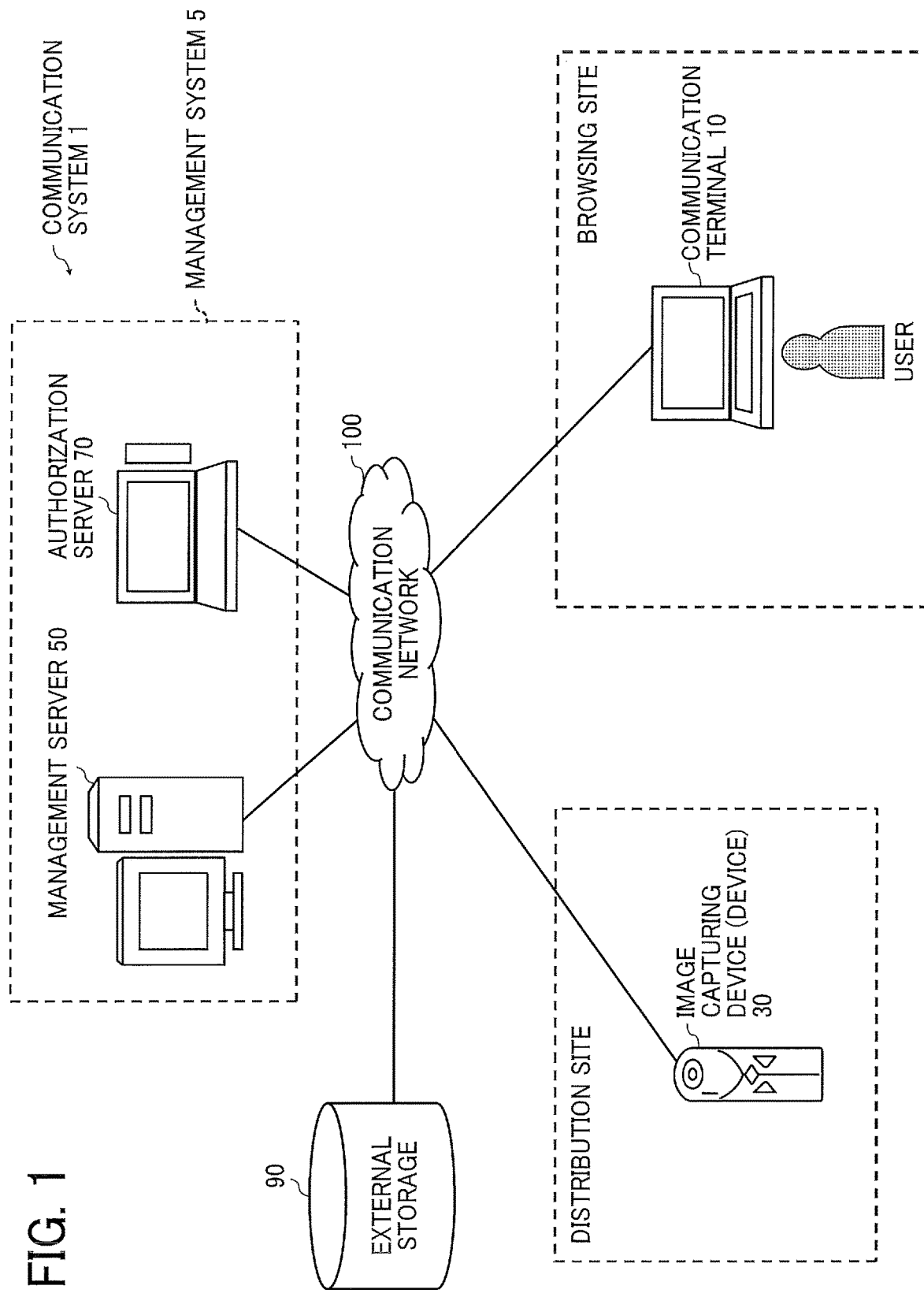
FIG. 1 is a diagram illustrating an example of an overall configuration of a communication system according to one of the embodiments of the disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

The terminology used herein is for the purpose of describing particular embodiments only and is not intended to be limiting of the present invention. As used herein, the singular forms "a," "an," and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, embodiments of the present disclosure are described with reference to the drawings. In the description of the drawings, the same elements are denoted by the same reference numerals, and redundant descriptions thereof are omitted.

EMBODIMENT

Overview of Communication System:

Referring to FIG. 1, an overview of a communication system 1 according to an embodiment is described below. FIG. 1 is a diagram illustrating an example of an overall configuration of the communication system 1 according to the present embodiment. The communication system 1 illustrated in FIG. 1 is a system in which a captured image such as a video image distributed from a distribution site is displayed at a plurality of browsing sites by participating in a predetermined event such as a remote communication provided by a management system 5, and thereby a state of the distribution site is viewable in real time. The browsing site, which may be referred to as a viewer site, is a site where a user who views the image resides. In the description of the present embodiment, examples of the predetermined event include a remote conference, a remote class, a remote medical examination, a meeting or consultation, inspection for a remote site, monitoring for a remote site, and patrol for remote site that are implemented by communication between remote sites via the management system 5.

As illustrated in FIG. 1, the communication system 1 includes a communication terminal 10 located at a browsing site, an image capturing device 30 located at a site being as a distribution site, a management server 50, and an authorization server 70. The communication terminal 10, the image capturing device 30, the management server 50, and the authorization server 70 included in the communication system 1 are communicably connected to each other via a communication network 100. The communication network 100 includes, for example, the Internet, a mobile communication network, a local area network (LAN). The communication network 100 includes a network by not only wired communications but also a network by wireless communications such as 3rd generation (3G), 4th generation (4G), 5th generation (5G), Wireless Fidelity (registered trademark) (Wi-Fi), Worldwide Interoperability for Microwave Access (WiMAX) or Long Term Evolution (LTE).

The communication terminal 10 is a computer such as a notebook Personal Computer (PC) used by a user at the browsing site. For example, the communication terminal 10 participates in a predetermined event provided by the management server 50 after user authentication performed by the management server 50. The communication terminal 10 displays a captured image (image) captured, or obtained, by the image capturing device 30 installed at the distribution site, and allows the user to browse a state of the distribution site.

The communication terminal 10 is not limited to the notebook PC, and may be, for example, a desktop PC, a smartphone, a tablet terminal, a wearable terminal, a Head Mount Display (HMD), or an Interactive White Board (IWB: an electronic whiteboard having mutual communication capability).

The image capturing device 30 is a device that is installed at the distribution site that is a site such as an office or a factory and participates in a predetermined event provided by the management server 50. The image capturing device 30 is registered, in advance, with the management server 50. When an event is started in response to a request from a user, the image capturing device 30 activates an installed application and participates in the event as a participant. The image capturing device 30 captures an image of an object or surroundings such as scenery in the distribution site, obtains the captured image (image), and transmits the captured image (image) to the communication terminal 10 participating in the event via the management server 50. The captured image (image) obtained by the image capturing device 30 may be a video image or a still image, or may include both of a video image and a still image. Further, the captured image (image) may be provided with audio.

The image capturing device 30 is an example of a device that participates in an event provided by the management server 50. The device participating in an event is not limited to an image capturing device, and may be a video conference terminal, an Interactive White Board (IWB: an electronic whiteboard having mutual communication capability), or a mobile object such as a robot that moves around within a distribution site.

In addition, the distribution site where the image capturing device 30 is installed is not limited to an office, a factory, or the like, and may be, for example, an outdoor site such as a business facility, a construction site, a substation, a farmstead, a field, an agricultural farm, a cultivated land, or a disaster site, or an indoor site such as a school, a warehouse, a commercial facility, a hospital, or a nursing facility. That is, the distribution site where the image capturing device 30 is installed may be any site where a user desires to execute an event such as a remote conference or a remote inspection from a browsing site.

The management server 50 is a server computer that provides and manages events executed between the communication terminal 10 and the image capturing device 30. The management server 50 manages and controls communication between the communication terminal 10 and the image capturing device 30, and relays image data to be transmitted or received. The authorization server 70 is a server computer that performs authentication and authorization processing for a user who is to participate in an event provided by the management server 50. The authorization server 70 also cooperates with an external storage service that provides external storage 90 and stores an authorization token (access information for the external storage 90) associated with a user who has a contract to use the external storage 90.

The management server 50 and the authorization server 70 are included in a management system 5. The management system 5 may be, for example, a computer in which all or some of the functions of the management server 50 and the authorization server 70 are combined. In addition, each of the management server 50 and the authorization server 70 may be implemented by a plurality of computers in manner that the functions of each of the management server 50 and the authorization server 70 are distributed among the plurality of computers. In the description of the present embodiment, the management server 50 and the authorization server 70 are server computers being in a cloud environment. In some embodiments, the management server 50 and the authorization server 70 are server computers being in an on-premises environment.

The external storage 90 is a storage service (or online storage) provided by an external providing service via the communication network 100. The external storage 90 is, for example, a storage destination for storing a data file on a cloud, and a user who has a contract to use an external storage service may store and browse data using his/her own authorization token.

Figure 2:
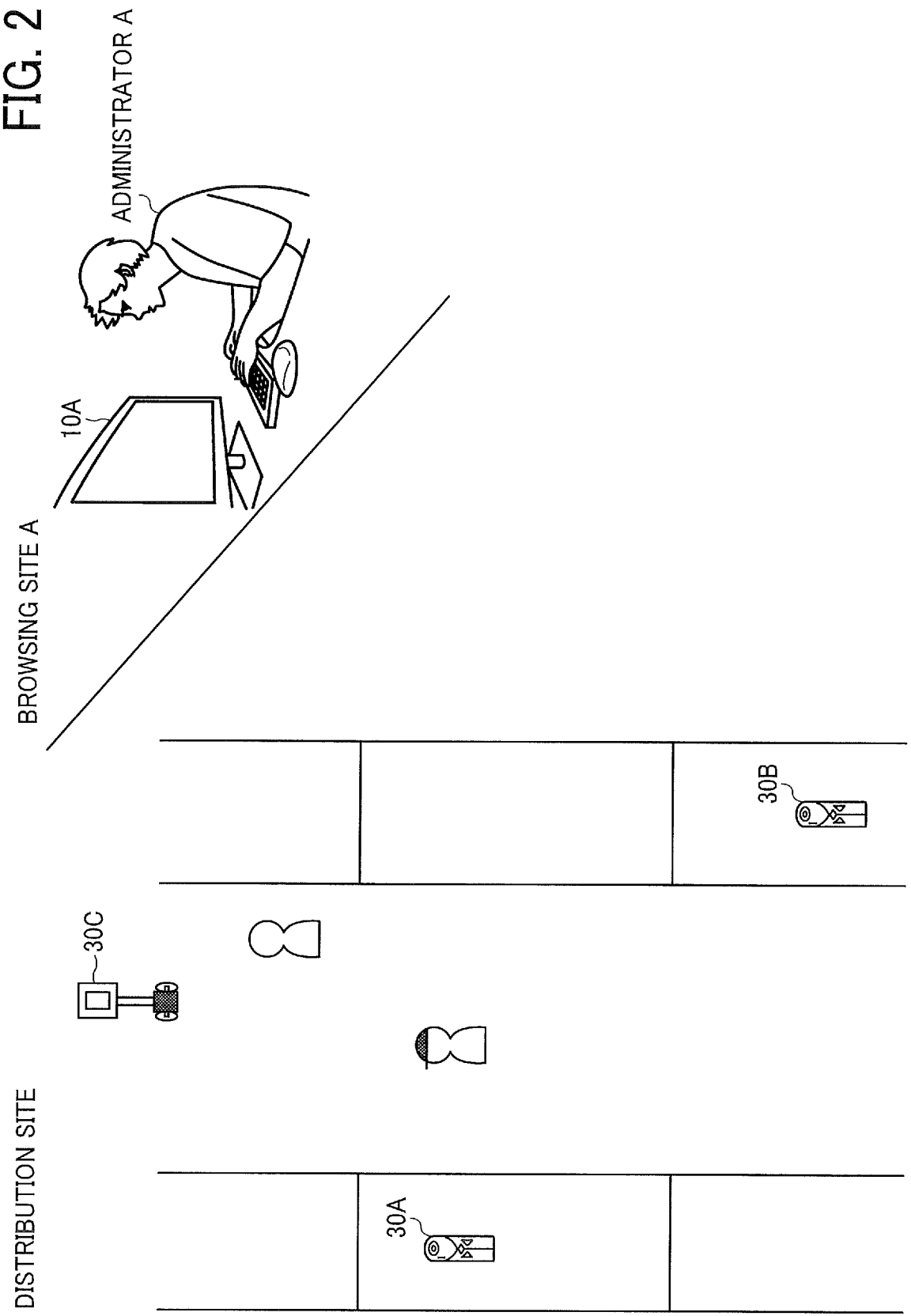
FIG. 2 is a diagram illustrating an example of overview of the communication system according to the one of the embodiments of the disclosure.

Referring to FIG. 2 and FIG. 3, examples of usage scenes of the communication system 1 are described below. FIGS. 2 and 3 are diagrams each illustrating an example of an overview of the communication system 1 according to the present embodiment.

FIG. 2 is a diagram illustrating an example of a usage scene of the communication system 1 in which remote communication is established between a plurality of image capturing devices 30 (30A to 30C) installed in a distribution site and a communication terminal 10A used by an administrator A who is a user at a browsing site A.

The distribution site illustrated in FIG. 2 is, for example, a site such as a factory or a warehouse where predetermined work is performed by a plurality of workers. As illustrated in FIG. 2, the plurality of image capturing devices 30 (30A to 30C) are installed at the distribution site. Among them, the image capturing device 30A and the image capturing device 30B are installed so as to be fixed on, for example, working benches in the site and perform image capturing processing in relation to the surroundings of the installation positions. The image capturing device 30C is provided in a robot that travels within the distribution site, and performs image capturing while the robot travels. Each of the image capturing devices 30 (30A to 30C) transmits an acquired captured image (image) to the communication terminal 10A used by the administrator A so as to be displayed in an event being executed among the image capturing devices 30 and the communication terminal 10A, which is used by the administrator A. In addition, the administrator A, who is a user at the browsing site A that is a remote location, uses the communication terminal 10 A to perform the remote communication with the image capturing device 30, which is installed at the distribution site, thereby viewing a captured image (image) representing a state of the distribution site, or performing maintenance management of the distribution site.

In addition, as illustrated in FIG. 3, a plurality of users located at different browsing sites may participate in an event and perform remote communication with the image capturing devices 30 installed at a distribution site. FIG. 3 is a diagram illustrating an example of a usage scene of the communication system 1 in which the administrator A who is a user at the browsing site A and an administrator B who is a user at a browsing site B respectively use the communication terminal 10A and a communication terminal 10B to establish remote communication with the image capturing devices 30 installed in the distribution site by participating in the same event.

In each of the use scenes illustrated in FIG. 2 and FIG. 3, a device such as an image capturing device is participating in an event as a site-participant in the same manner as a user participant participating in an event such as a web conference using a communication terminal. In such use scenes, there may be a desire to have a device at a remote location take a photograph (image) according to an instruction from a user participating in the event and upload the photograph (image) to external storage in relation to which the user has a contract.

However, conventionally, in order to upload, to external storage of a specific user, data acquired by a device such as an image capturing device participating in an event such as a remote conference, the device is caused to have authentication information of the user so that the device directly uploads the data to the external storage with user authority, or the device transfers the data to a communication terminal used by the user before uploading the data. Accordingly, processing of uploading data acquired by the device to the external storage with the user authority includes, for example, processing for user authentication with the device, and thereby the processing takes time and effort.

To deal with this, in the communication system 1, the management server 50 acquires an authorization token for accessing the external storage 90 with user authority based on a request from a user who is a contractor of the external storage 90, and the image capturing device 30 transmits information for specifying the authorization token together with the acquired data to the management server 50. More specifically, on the premise that the management server 50 operates as a resource server of Open Authorization (OAuth) 2.0 and acquires an access token of a user, the management server 50 temporarily stores an authorization token and provides the authorization token to the external storage 90 together with data acquired from the image captured device 30, thereby the data is to be uploaded without passing access information of the user such as the authorization token for the external storage 90 to the image capturing device 30.

Accordingly, the communication system 1 directly uploads the data acquired by the device to the external storage 90 without performing a device operation by the user and user authentication with the device. For example, image data or the like acquired from a device installed at a distribution site as illustrated in FIG. 2 and FIG. 3 is uploaded from the device to the external storage 90 in relation to which a user at a browsing site has a contract, and thereby time and effort for the processing of uploading may be reduced.

Figure 4:
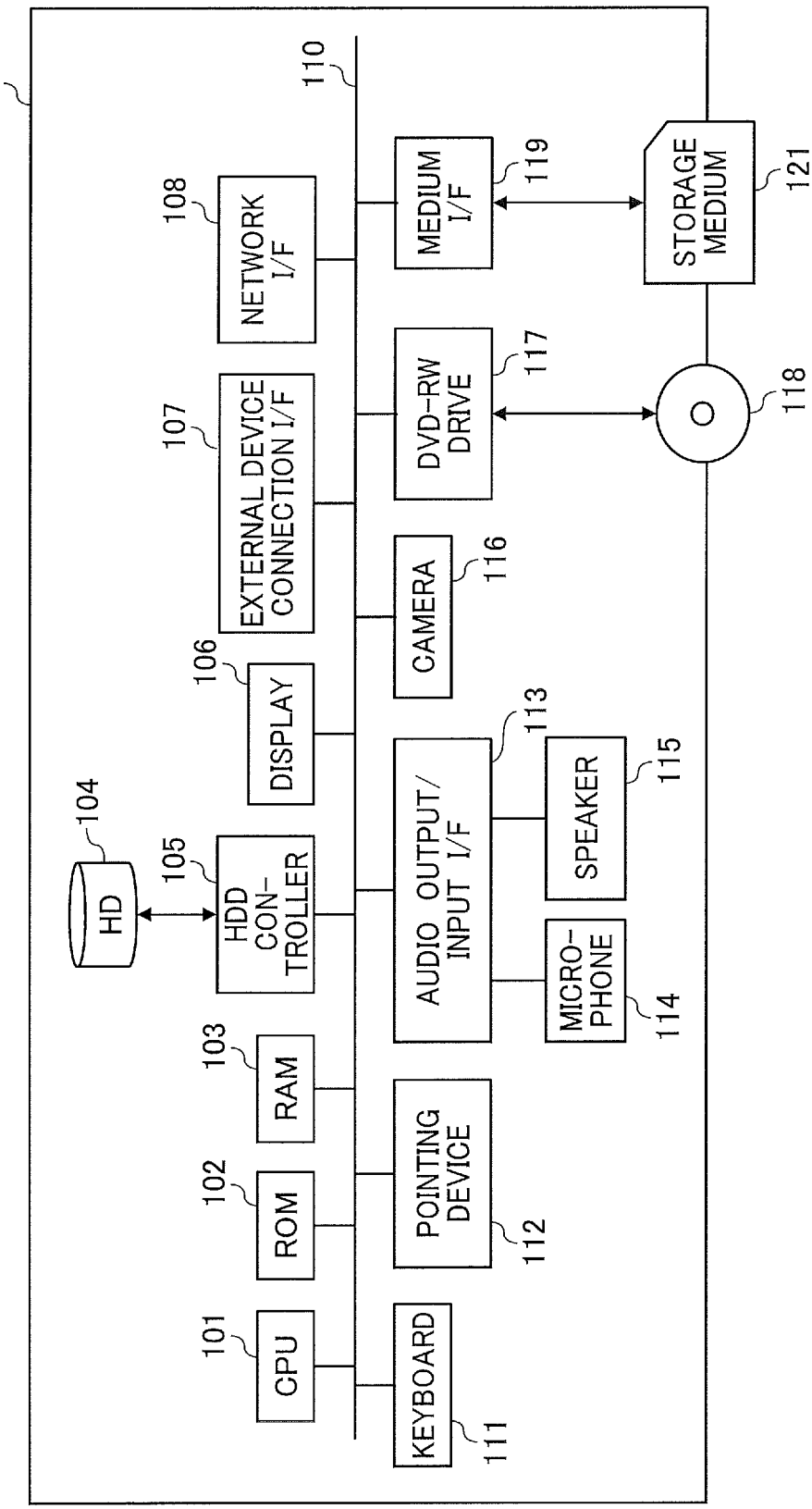
FIG. 4 is a block diagram illustrating an example of a hardware configuration of a communication terminal according to the one of the embodiments of the disclosure.
Figure 5:
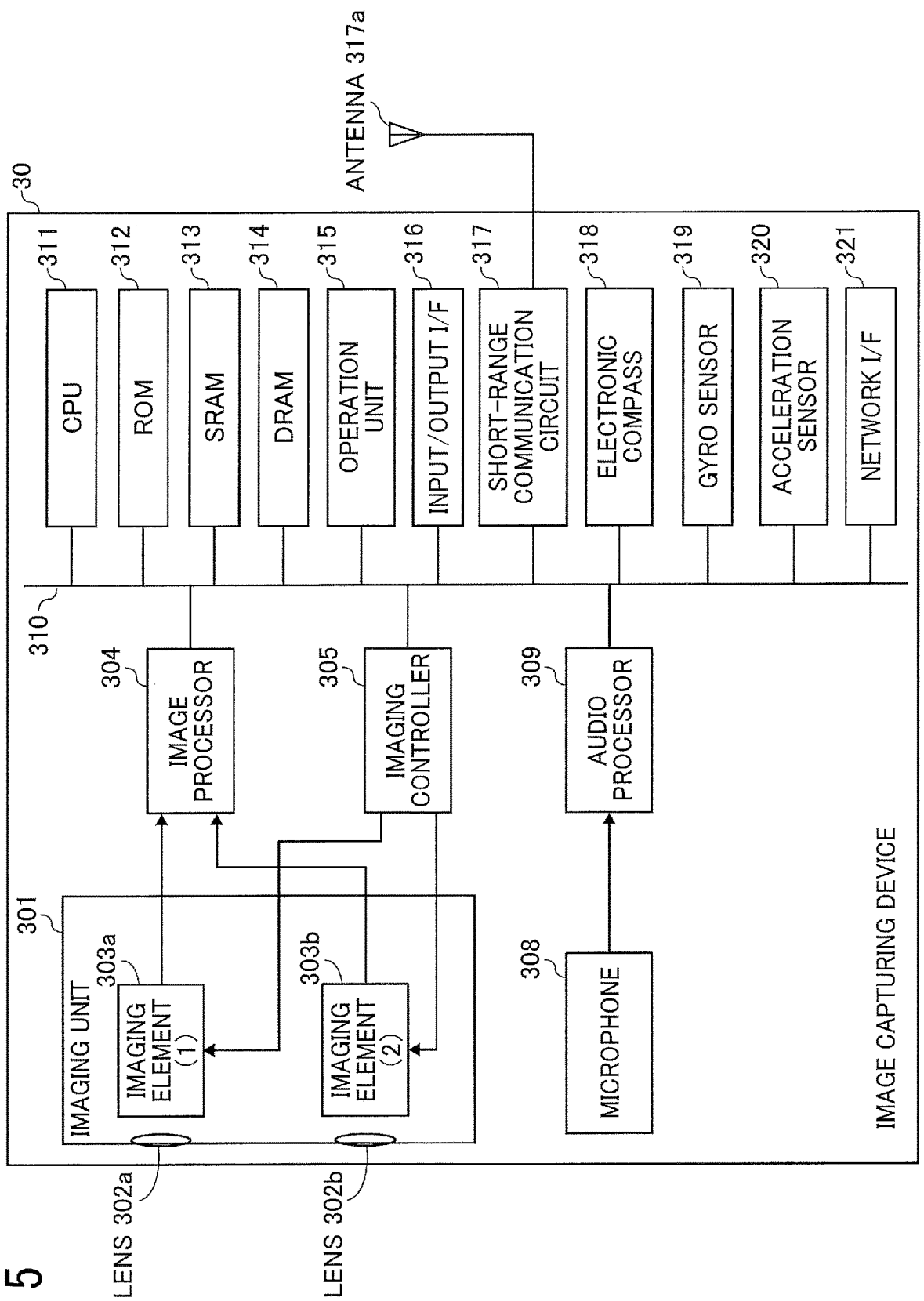
FIG. 5 is a block diagram illustrating an example of a hardware configuration of an image capturing device according to the one of the embodiments of the disclosure.
Figure 6:
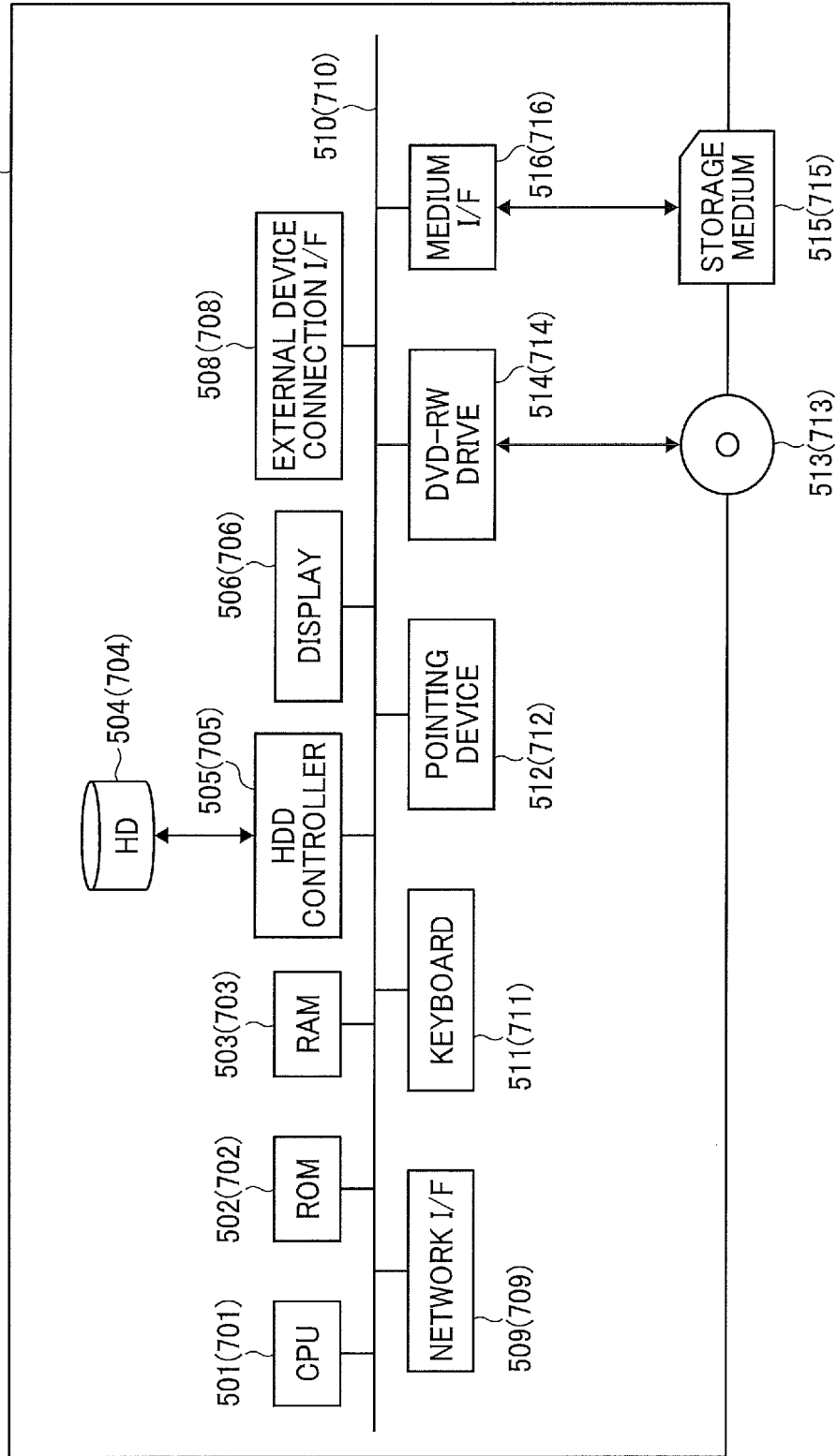
FIG. 6 is a block diagram illustrating an example of a hardware configuration of one of a management server and an authorization server according to the one of the embodiments of the disclosure.

Hardware Configuration:

Next, referring to FIG. 4 to FIG. 6, hardware configurations of each apparatus, device, and terminal of the communication system 1 are described according to the present embodiment. In the hardware configuration illustrated in FIG. 4 to FIG. 6, components or elements may be added or deleted as appropriate.

Hardware Configuration of Communication Terminal:

A hardware configuration of the communication terminal 10 according to the present embodiment is described with reference to FIG. 4. FIG. 4 is a block diagram illustrating an example of a hardware configuration of the communication terminal 10 according to the present embodiment. The communication terminal 10 is implemented by a computer, and as illustrated in FIG. 4, includes a central processing unit (CPU) 101, a read only memory (ROM) 102, a random access memory (RAM) 103, a hard disk (HD) 104, a hard disk drive (HDD) controller 105, a display 106, an external device connection interface (I/F) 107, a network I/F 108, a bus line 110, a keyboard 111, an audio output/input I/F 113, a microphone 114, a speaker 115, a camera 116, a pointing device 112, a digital versatile disc rewritable (DVD-RW) drive 117 and a medium I/F 119.

The CPU 101 controls entire operation of the communication terminal 10. The ROM 102 stores a program used for driving the CPU 101, such as an initial program loader (IPL). The RAM 103 is used as a work area of the CPU 101. The HD 104 stores various data such as a program. The HDD controller 105 controls reading or writing of various data to the HD 104 under the control of the CPU 101. The display 106 is an example of a display unit that displays various types of information such as a cursor, a menu, a window, characters, or an image. In one example, the display 106 is a touch panel display provided with an input device. The external device connection I/F 107 is an interface for connecting various external devices. The network I/F 108 is an interface for performing data communication using the communication network 100. The bus line 110 is, for example, an address bus or a data bus, which electrically connects the elements such as the CPU 101 illustrated in FIG. 4.

The keyboard 111 is an example of an input device including a plurality of keys for inputting characters, numerical values, various instructions, and the like. The pointing device 112 is an example of the input device that allows a user to select or execute various instruction, select a target for processing, or move a cursor being displayed. The input device is not limited to the keyboard 111 and the pointing device 112, and may be a touch panel, a voice input device, or the like. The audio input/output I/F 113 is a circuit for inputting or outputting an audio signal between the microphone 114 and the speaker 115 under control of the CPU 101. The microphone 114 is an example of a built-in audio collecting unit to input audio. The speaker 115 is an example of a built-in output unit to output an audio signal. The camera 116 is an example of a built-in image capturing unit to capture an image of an object to obtain image data. Note that the microphone 114, the speaker 115, or the camera 116 may be an external device in alternative to the built-in device of the communication terminal 10. The DVD-RW drive 117 controls reading or writing of various data to or from a DVD-RW 118, which is an example of a removable recording medium. The removable recording medium is not limited to the DVD-RW and may be a digital versatile disk-recordable (DVD-R), or a BLU-RAY (registered trademark) disc (BLU-RAY disk), for example.

The medium I/F 119 controls reading or writing (storing) of data from or to a storage medium (recording medium) 121 such as a flash memory.

Hardware Configuration of Image Capturing Device:

Referring to FIG. 5, a hardware configuration of the image capturing device 30 according to the present embodiment is described below. FIG. 5 is a block diagram illustrating an example of a hardware configuration of an image capturing device according to the present embodiment. In FIG. 3, as an example of the image capturing device 30, a spherical image capturing device that acquires a spherical image by capturing an image of an object or surroundings such as scenery is illustrated. In some embodiments, the image capturing device 30 is a general-purpose digital camera or a camera of a smartphone that acquires a general planar image. In some embodiments, the image capturing device 30 is a wide-angle camera that acquires a wide-angle image having an angle of view equal to or larger than a predetermined value. In the following description of the embodiment, the image capturing device 30 that is a spherical (omnidirectional) image capturing device having two imaging elements is used. However, the image capturing device 30 may have more than two imaging elements. In addition, the image capturing device 30 is not necessarily an image capturing device dedicated to omnidirectional image capturing. Alternatively, an external omnidirectional image capturing unit may be attached to a general-purpose digital camera or a smartphone to implement an image capturing device having substantially the same function as that of the image capturing device 30 according to the present embodiment.

As illustrated in FIG. 5, the image capturing device 30 includes an imaging unit 301, an image processor 304, an imaging controller 305, a microphone 308, an audio processor 309, a CPU 311, a ROM 312, a static random access memory (SRAM) 313, a dynamic random access memory (DRAM) 314, an operation unit 315, an input/output I/F 316, a short-range communication circuit 317, an antenna 317a for the short-range communication circuit 317, an electronic compass 318, a gyro sensor 319, an acceleration sensor 320, and a network I/F 321.

The imaging unit 301 includes two wide-angle lenses (so-called fish-eye lenses) 302a and 302b (collectively referred to as lens 302 unless they need to be distinguished from each other), each having an angle of view of equal to or greater than 180 degrees so as to form a hemispherical image. The imaging unit 301 further includes the two imaging elements 303a and 303b corresponding to the lenses 302a and 302b respectively. The imaging elements 303a and 303b each includes an imaging sensor such as a complementary metal oxide semiconductor (CMOS) sensor and a charge-coupled device (CCD) sensor, a timing generation circuit, and a group of registers. The imaging sensor converts an optical image formed by the lenses 302a and 302b into electric signals to output image data. The timing generation circuit generates horizontal or vertical synchronization signals, pixel clocks and the like for the imaging sensor. Various commands, parameters and the like for operations of the imaging elements 303a and 303b are set in the group of registers.

Each of the imaging elements 303a and 303b of the imaging unit 301 is connected to the image processor 304 via a parallel I/F bus. In addition, each of the imaging elements 303a and 303b of the imaging unit 301 is connected to the imaging controller 305 via a serial I/F bus such as an Inter Integrated Circuit (I2C) bus. The image processor 304, the imaging controller 305, and the audio processor 309 are each connected to the CPU 311 via a bus 310. Furthermore, the ROM 312, the SRAM 313, the DRAM 314, the operation unit 315, the input/output I/F 316, the short-range communication circuit 317, the electronic compass 318, the gyro sensor 319, the acceleration sensor 320, and the network I/F 321 are also connected to the bus 310.

The image processor 304 acquires image data from each of the imaging elements 303a and 303b via the parallel I/F bus and performs predetermined processing on each image data. Thereafter, the image processor 304 combines these image data to generate data of an equirectangular projection image.

The imaging controller 305 usually functions as a master device while each of the imaging elements 303a and 303b usually functions as a slave device. The imaging controller 305 sets commands or the like in the group of registers of each of the imaging elements 303a and 303b via the I2C bus. The imaging controller 305 receives various commands from the CPU 311. In addition, the image controller 305 obtains status data of the group of registers of each of the imaging elements 303a and 303b through the I2C bus and transmits the status data to the CPU 311.

The imaging controller 305 instructs the imaging elements 303a and 303b to output the image data at a time when the shutter button of the operation unit 315 is pressed. In some cases, the image capturing device 30 displays a preview image on a display (e.g., a display of an external terminal such as a smartphone that performs short-range communication with the image capturing device 30 through the short-range communication circuit 317) or displays a moving image (video image, movie). In case of displaying movie, image data are continuously output from the imaging elements 303a and 303b at a predetermined frame rate (frames per minute).

Furthermore, the imaging controller 305 operates in cooperation with the CPU 311, to synchronize the time when the imaging element 303a outputs image data and the time when the imaging element 303b outputs the image data. In the present embodiment, the image capturing device 30 does not include a display unit (display). However, in some embodiments, the image capturing device 30 may include a display. The microphone 308 converts sound into audio data (signals). The audio processor 309 obtains audio data output from the microphone 308 via an I/F bus and performs predetermined processing on the audio data.

The CPU 311 controls entire operation of the image capturing device 30, for example, by performing predetermined processing. The ROM 312 stores various programs for execution by the CPU 311. Each of the SRAM 313 and the DRAM 314 operates as a work memory to store programs loaded from the ROM 312 for execution by the CPU 311 or data in current processing. More specifically, in one example, the DRAM 314 stores image data currently processed by the image processor 304 and data of the equirectangular projection image on which processing has been performed.

The operation unit 315 collectively refers to various operation keys, a power switch, the shutter button, and a touch panel having functions of both displaying information and receiving input from a user, which can be used in combination. The user operates the operation unit 315 to input various image capturing (photographing) modes or image capturing (photographing) conditions.

The input/output I/F 316 collectively refers to an interface circuit such as a universal serial bus (USB) I/F that allows the image capturing device 30 to communicate data with an external medium such as a secure digital (SD) card or an external personal computer. The input/output I/F 316 supports at least one of wired and wireless communications. The data of the equirectangular projection image, which is stored in the DRAM 314, is stored in the external medium via the input/output I/F 316 or transmitted to an external terminal (apparatus) via the input/output I/F 316, as appropriate.

The short-range communication circuit 317 communicates data with the external terminal (apparatus) via the antenna 317a of the image capturing device 30 by short-range wireless communication such as near field communication (NFC), BLUETOOTH (registered trademark), and Wi-Fi. The short-range communication circuit 317 transmits the data of equirectangular projection image to an external terminal (apparatus).

The electronic compass 318 calculates an orientation of the image capturing device 30 from the Earth's magnetism to output orientation information. This orientation and tilt information is an example of related information, which is metadata described in compliance with Exchangeable image file format (Exif). This information is used for image processing such as image correction of captured images. The related information also includes a date and time when the image is captured by the image capturing device 30, and a data size of the image data. The gyro sensor 319 detects the change in tilt of the image capturing device 30 (roll, pitch, yaw) with movement of the image capturing device 30. The change in angle is one example of related information (metadata) described in compliance with Exif. This information is used for image processing such as image correction of captured images. The acceleration sensor 320 detects acceleration in three axial directions. The image capturing device 30 calculates position (an angle with respect to the direction of gravity) of the image capturing device 30, based on the acceleration detected by the acceleration sensor 320. With the acceleration sensor 320, the image capturing device 30 corrects tilt of image with high accuracy. The network I/F 321 is an interface for performing data communication, via such as a router, using the communication network 100 such as the Internet.

Hardware Configuration of Management Server:

Next, a hardware configuration of the management server 50 is described with reference to FIG. 6. FIG. 6 is a block diagram illustrating an example of a hardware configuration of the management server 50 according to the present embodiment. Each of the elements of hardware configuration of the management server 50 is denoted by a reference numeral in 500 series. The management server 50 is implemented by a computer, and as illustrated in FIG. 6, includes a CPU 501, a ROM 502, a RAM 503, an HD 504, an HDD controller 505, a display 506, an external device connection I/F 508, a network I/F 509, a bus line 510, a keyboard 511, a pointing device 512, a DVD-RW drive 514, and a medium I/F 516.

The CPU 501 controls entire operation of the management server 50. The ROM 502 stores a program such as an Initial Program Loader (IPL) used for driving the CPU 501. The RAM 503 is used as a work area for the CPU 501. The HD 504 stores various data such as a program. The HDD controller 505 controls reading or writing of various data to or from the HD 504 under control of the CPU 501. The display 506 displays various types of information such as a cursor, a menu, a window, characters, or an image. In one example, the display 506 is a touch panel display provided with an input device. The external device connection I/F 508 is an interface for connecting to various external devices. The network I/F 509 is an interface for performing data communication using the communication network 100. The bus line 510 is, for example, an address bus or a data bus, which electrically connects the elements such as the CPU 501 illustrated in FIG. 6.

The keyboard 511 is one example of an input device including a plurality of keys for inputting characters, numerical values, various instructions, and the like. The pointing device 512 is an example of the input device that allows a user to select or execute various instructions, select a target for processing, or move a cursor being displayed. The input device is not limited to the keyboard 511 and the pointing device 512, and may be a touch panel, a voice input device, or the like. The DVD-RW drive 514 controls reading or writing of various data to or from a DVD-RW 513, which is an example of a removable recording medium. The removable recording medium is not limited to the DVD-RW and may be a DVD-R, or a BLU-RAY (registered trademark) disc (BLU-RAY disk), for example. The medium I/F 516 controls reading or writing (storing) of data from or to a storage medium (recording medium) 515 such as a flash memory.

Hardware Configuration of Authorization Server:

FIG. 6 is a diagram illustrating an example of a hardware configuration of the authorization server 70 according to the present embodiment. Each hardware element of the authorization server 70 is denoted by a reference numeral in 700 series. The authorization server 70 is implemented by a computer and has the same configuration as that of the management server 50 as illustrated in FIG. 6, and thus the description of each of the elements of the hardware configuration is omitted.

Further, any one of the above-described control programs may be recorded in a file in a format installable or executable on a computer-readable recording medium for distribution. Examples of the recording medium include a Compact Disc Recordable (CD-R), a DVD, a BLU-RAY Disc, an SD card, and a USB memory. In addition, such recording media may be provided in the domestic markets or foreign markets as program products. For example, the management system 5 implements a method according to the present disclosure by executing a program according to the present disclosure.

Figure 7:
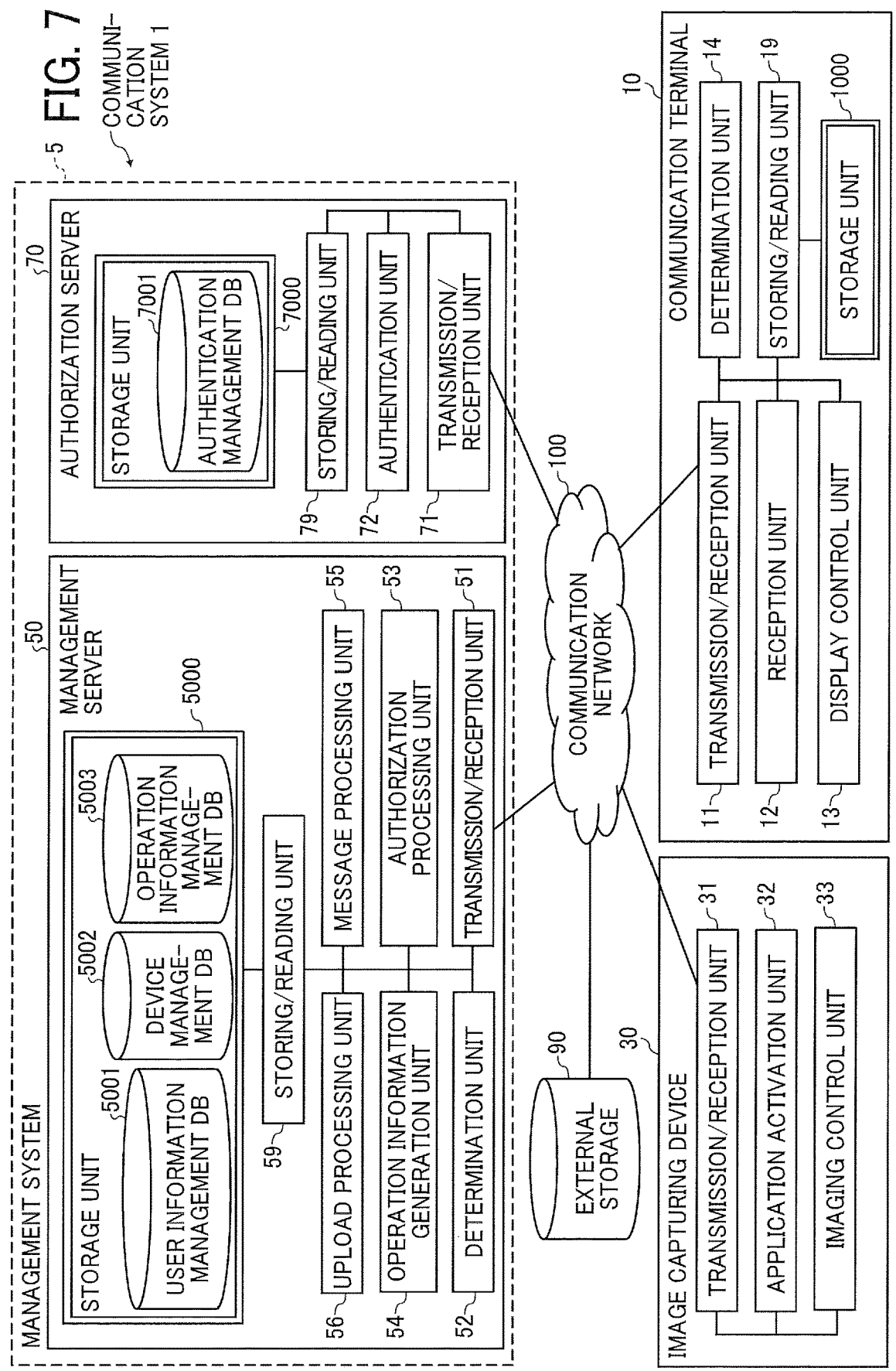
FIG. 7 is a block diagram illustrating an example of a functional configuration of the communication system according to the one of the embodiments of the disclosure.

Functional Configuration:

A description is now given of a functional configuration of the communication system 1 according to the present embodiment of the disclosure, with reference to FIG. 7 to FIG. 11. FIG. 7 is a block diagram illustrating an example of a functional configuration of the communication system 1 according to the present embodiment. A part that is related to processing or operation, which is described later, of the devices and terminals of FIG. 1 is illustrated in FIG. 7.

Functional Configuration of Communication Terminal:

Referring to FIG. 7, a functional configuration of the communication terminal 10 is described below. The communication terminal 10 includes a transmission/reception unit 11, a reception unit 12, a display control unit 13, a determination unit 14, and a storing/reading unit 19. Each of these units is a function that is implemented by operating any of the elements illustrated in FIG. 4 with instructions from the CPU 101 according to the control program for a communication terminal expanded from the HD 104 to the RAM 103. The communication terminal 10 further includes a storage unit 1000 that is implemented by the ROM 102, the HD 104, or the storage medium 121 illustrated in FIG. 4.

The transmission/reception unit 11 is mainly implemented by processing of the CPU 101 in relation to the network I/F 108 and transmits or receives various data or information to or from other devices or terminals through the communication network 100.

The reception unit 12 is implemented mainly by processing of the CPU 101 and the keyboard 111 or the pointing devices 112 and receives various selections or inputs from users.

The display control unit 13 is implemented mainly by processing of the CPU 101 and causes the display 106 to display various screens by accessing the management server 50 using a web browser. Specifically, for example, the display control unit 13 starts and executes an application or a browser installed on the communication terminal 10 to access the management server 50. Then, the display control unit 13 downloads, for example, Web Application (WebAPP) that includes at least Hyper Text Markup Language (HTML) and further includes Cascading Style Sheets (CSS) or JAVA SCRIPT, and causes the display 106 to display various image data generated using the WebAPP. For example, the display control unit 13 causes the display 106 to display image data generated by HTML5 that includes data in a format of Extensible Markup Language (XML), JavaScript Object Notation (JSON), or Simple Object Access Protocol (SOAP).

The determination unit 14 is implemented by processing of the CPU 101 and executes various determinations.

The storing/reading unit 19 is implemented mainly by processing of the CPU 101 and stores various types of data (or information) in the storage unit 1000 or reads various types of data (or information) from the storage unit 1000.

Functional Configuration of Image Capturing Device:

Referring to FIG. 7, a functional configuration of the image capturing device 30 according to the present embodiment is described below. The image capturing device 30 includes a transmission/reception unit 31, an application activation unit 32, an imaging control unit 33, and a storing/reading unit 39. Each of these units is a function that is implemented by operating any of the elements illustrated in FIG. 5 with instructions from the CPU 311 according to the control program for an image capturing device expanded from the SRAM 313 to the DRAM 314. The image capturing device 30 further includes a storage unit 3000 that is implemented by the ROM 312, the SRAM 313, or the DRAM 314 illustrated in FIG. 5. The storage unit 3000 stores a Globally Unique Identifier (GUID) identifying the own device (i.e., the image capturing device 30).

The transmission/reception unit 31 is mainly implemented by processing of the CPU 311, and transmits or receives various data or information to or from other devices or terminals. The transmission/reception unit 31 communicates data with other devices or terminals through the communication network 100 via the network I/F 321.

The application activation unit 32 is mainly implemented by processing of the CPU 311, and activates an application to participate in an event provided by the management server 50 in response to a request from the management server 50. The image capturing device 30 participates in an event provided by the management server 50 by activating an application installed by the application activation unit 32.

The imaging control unit 33 is mainly implemented by the imaging unit 301, the image processor 304, and the imaging controller 305 each illustrated in FIG. 5 and operating according to instructions of the CPU 311. The image control unit 33 captures an image of the object or surroundings (for example, scenery) to obtain captured image data.

The storing/reading unit 39 is implemented mainly by processing of the CPU 311 and stores various types of data (or information) in the storage unit 3000 or reads various types of data (or information) from the storage unit 3000. In addition, in the storage unit 3000, captured image data acquired by the imaging control unit 33 performing image capturing processing. The captured image data stored in the storage unit 3000 is associated with an image capturing time of the captured image as metadata.

Functional Configuration of Management Server:

Referring to FIG. 7, a functional configuration of the management server 50 is described below. The management server 50 includes a transmission/reception unit 51, a determination unit 52, an authorization processing unit 53, an operation information generation unit 54, a message processing unit 55, an upload processing unit 56, and a storing/reading unit 59. Each of these units is a function that is implemented by operating any of the elements illustrated in FIG. 6 with instructions from the CPU 501 according to the control program for a management server expanded from the HD 504 to the RAM 503. The management server 50 further includes a storage unit 5000 that is implemented by the ROM 502, the HD 504, or the storage medium 515 illustrated in FIG. 6.

The transmission/reception unit 51 is mainly implemented by processing of the CPU 501 in relation to the network I/F 509 and transmits or receives various data or information to or from other devices or terminals through the communication network 100.

The determination unit 52 is implemented by processing of the CPU 501 and performs various determinations. The authorization processing unit 53 is mainly implemented by processing of the CPU 501, and performs authentication for a user by using the authorization server 70.

The operation information generation unit 54 is mainly implemented by processing of the CPU 501, and generates operation information related to an operation requested with respect to a device such as the image capturing device 30 based on an operation request, which is with respect to the device, transmitted from the communication terminal 10. For example, the operation information generation unit 54 generates operation information in which operation identification information for identifying a device operation corresponding to the received operation request is associated with an authorization token for the external storage 90 of the user who is a request source. The management server 50 stores the operation information generated by the operation information generation unit 54, and uses the authorization token included in the stored operation information in a subsequent step.

The message processing unit 55 is mainly implemented by processing of the CPU 501, and executes processing for performing arbitrary message exchange between participants participating in an event. For example, in response to a message transmission request transmitted from the communication terminal 10 used by the user who is a participant of an event, the message processing unit 55 transmits a message to a device such as the image capturing device 30 that is another participant of the event.

The upload processing unit 56 is mainly implemented by processing of the CPU 501, and uses the authorization token included in the operation information generated by the operation information generation unit 54 to upload information acquired in accordance with an operation of the image capturing device 30 or the like to the external storage 90 to which the user being the request source has access authority.

The storing/reading unit 59 is implemented mainly by processing of the CPU 501 and stores various types of data (or information) in the storage unit 5000 or reads various types of data (or information) from the storage unit 5000. Note that the storage unit 5000 may be configured as a storage device external to the management server 50.

Figures 8, 9, 10, 11:
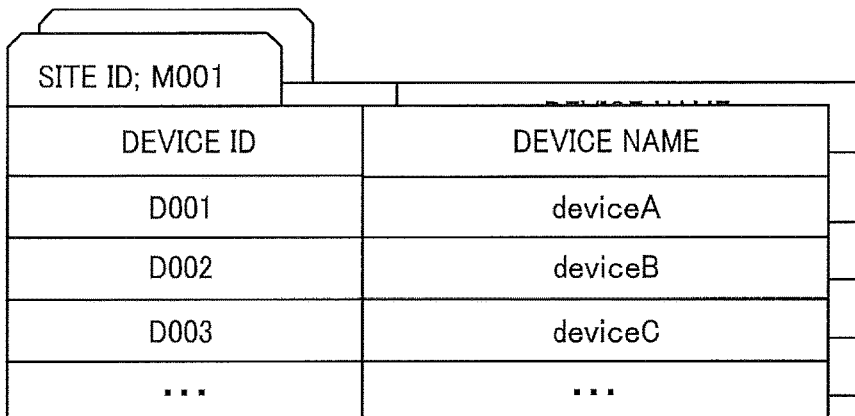
FIG. 8 is a conceptual diagram illustrating an example of a user information management table, according to the one of the embodiments of the disclosure.
FIG. 9 is a conceptual diagram illustrating an example of a device management table, according to the one of the embodiments of the disclosure.
FIG. 10 is a conceptual diagram illustrating an example of an operation information management table, according to the one of the embodiments of the disclosure.
FIG. 11 is a conceptual diagram illustrating an example of an authentication information management table, according the one of the embodiments of the disclosure.

User Information Management Table:

FIG. 8 is a conceptual diagram illustrating an example of a user information management table, according to the present embodiment. The storage unit 5000 includes a user information management database (DB) 5001 including the user information management table as illustrated in FIG. 8.

In the user information management table, user information in which user identification information (user identification (ID) and user name) for identifying a user managed by the management server 50 and an authorization token for the external storage 90 are associated with each other is stored. The authorization token is access information for accessing the external storage 90 with respect to which the user has a contract, that is, the external storage 90 to which the user has access authority. That is, the authorization token is uniquely specified for each user. The user information management table stores, as the user information, an authorization token that is access information for accessing the external storage 90 in association with each user.

Device Management Table:

FIG. 9 is a conceptual diagram illustrating an example of a device management table, according to the present embodiment. The device management table is a table for managing devices such as the image capturing device 30 registered with the management server 50. The storage unit 5000 includes a device management DB 5002 including the device management table as illustrated in FIG. 9.

In the device management table, a device ID for identifying a device installed at a distribution site and a device name are associated with each other for each site ID for identifying the corresponding distribution site. When an event having a predetermined distribution site as a participant is started, the management server 50 activates an application installed on each device managed in the device management table, and allows each device to participate in the event using the activated application.

Operation Information Management Table:

FIG. 10 is a conceptual diagram illustrating an example of an operation information management table, according to the present embodiment. The operation information management table is a table for managing operation information related to an operation requested to a device such as the image capturing device 30. The storage unit 5000 includes an operation information management DB 5003 including the operation information management table as illustrated in FIG. 10.

In the operation information management table, operation identification information (operation ID) for identifying a device operation requested to a device, a device ID for identifying the device to which the device operation is requested, and an authorization token for the external storage 90 of a user who is a request source of the device operation are associated with each other. The management server 50 stores, in the operation information management table, the operation information generated by the operation information generation unit 54 in response to a request according to a user operation of the user.

Functional Configuration of Authorization Server:

Referring to FIG. 7, a functional configuration of the authorization server 70 is described below. The authorization server 70 includes a transmission/reception unit 71, an authentication unit 72, and a storing/reading unit 79. Each of these units is a function that is implemented by operating any of the elements illustrated in FIG. 6 with instructions from the CPU 701 according to the control program for an authorization server expanded from the HD 704 to the RAM 703. The authorization server 70 further includes a storage unit 7000 that is implemented by the ROM 702, the HD 704, or the storage medium 715 illustrated in FIG. 6.

The transmission/reception unit 71 is mainly implemented by processing of the CPU 701 in relation to the network I/F 709 and transmits or receives various data or information to or from other devices or terminals through the communication network 100. The authentication unit 72 is implemented by processing of the CPU 701, and performs authentication processing for users managed by the authorization server 70.

The storing/reading unit 79 is implemented mainly by processing of the CPU 701 and stores various types of data (or information) in the storage unit 7000 or reads various types of data (or information) from the storage unit 7000.

Authentication Information Management Table:

FIG. 11 is a conceptual diagram illustrating an example of an authentication information management table, according to the present embodiment. The storage unit 7000 includes an authentication information management DB 7001 including the authentication information management table as illustrated in FIG. 11.

In the authentication information management table, authorization information in which user information (user ID and user name) for identifying a user managed by the authorization server 70 and a password are associated with each other is stored. For example, the authentication information management table illustrated in FIG. 11 indicates that a user name of "Alice" is corresponding to a user ID of "A001" and a password of "a0101." The user identification information may include any one of a user ID for identifying a user and a user name.

Figure 12:
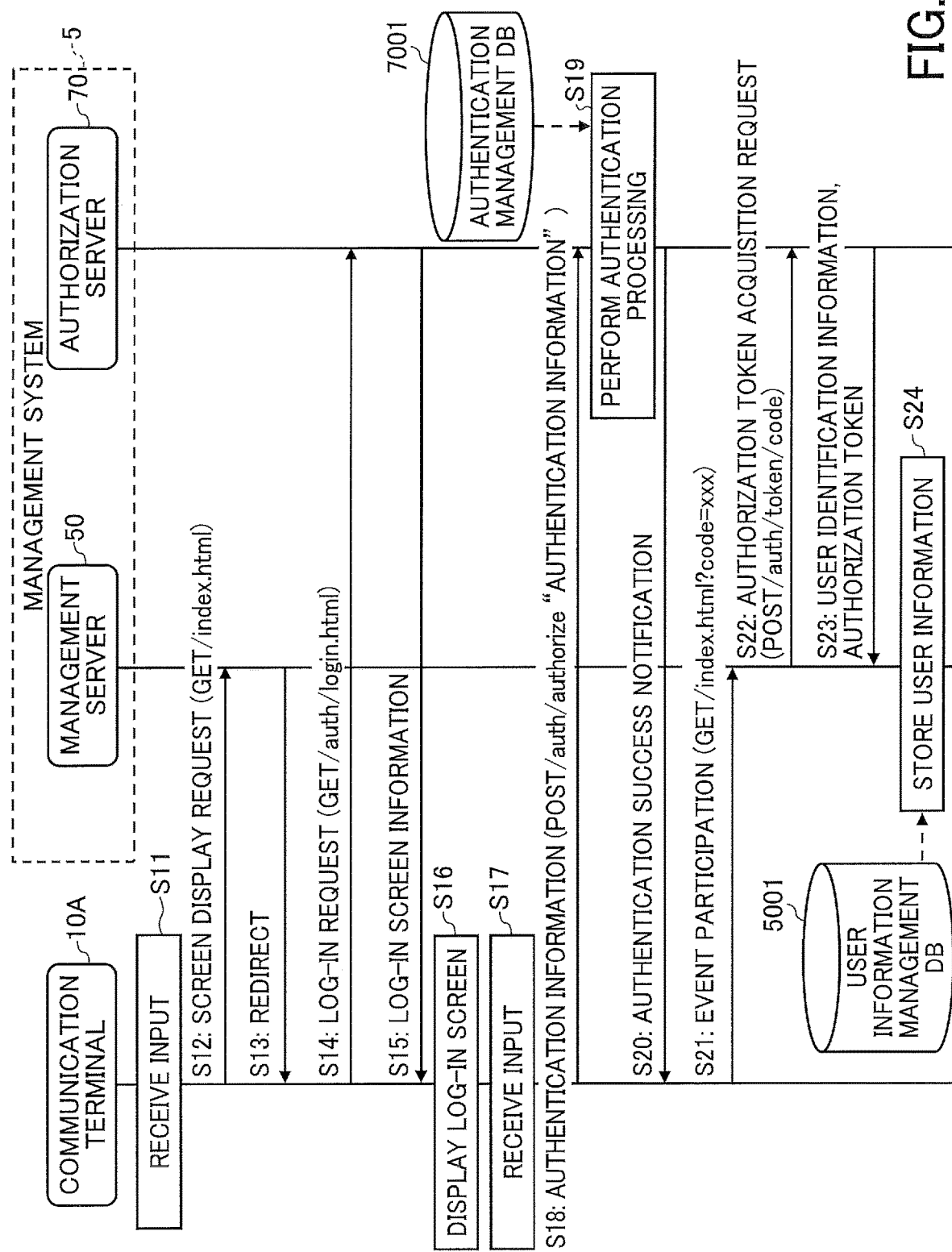
FIG. 12 is a sequence diagram illustrating an example of a user authentication process according to the one of the embodiments of the disclosure.

Processes or Operations:
User Authentication:

Referring to FIG. 12 to FIG. 17, processes and operations of the communication system 1 according to the present embodiment is described below. First, referring to FIG. 12, a process of authentication for allowing a user to participate, by using the communication terminal 10, in an event executed via the management server 50 is described. FIG. 12 is a sequence diagram illustrating an example of a user authentication process according to the present embodiment. The communication system 1 is to be described on the assumption that the management server 50 transfers authentication to the authorization server 70 based on processing of OAuth 2.0/OpenID Connect and the use of the external storage 90 is also authorized. In the example of FIG. 12, in order to start an event including remote communication, the communication terminal 10 accesses the management system 5, and authentication and authorization processing is performed to start the event. In the example of FIG. 12, the authentication and permission processing is performed for a user "Alice" who uses a communication terminal 10A.

First, the reception unit 12 of the communication terminal 10A receives a predetermined input operation by the user (step S11). More specifically, for example, the reception unit 12 activates an application, which is installed on the communication terminal 10A, or a browser and receives an input of a predetermined Uniform Resource Locator (URL).

Next, the transmission/reception unit 11 transmits a screen display request for requesting participation in the event to the management server 50 (step S12). Then, the authorization processing unit 53 of the management server 50 redirects with respect to the received screen display request to the communication terminal 10A that is a request source (step S13).

Next, the transmission/reception unit 11 of the communication terminal 10A transmits a log-in request for the event to the authorization server 70 (step S14). Accordingly, the transmission/reception unit 71 of the authorization server 70 receives the log-in request transmitted from the communication terminal 10A. Next, the transmission/reception unit 71 of the authorization server 70 transmits log-in screen information to the communication terminal 10A, which is the request source (step S15). Accordingly, the transmission/reception unit 11 of the communication terminal 10A receives the log-in screen information transmitted from the authorization server 70.

Next, the display control unit 13 of the communication terminal 10A causes the display 106 to display a log-in screen based on the log-in screen information received in step S15 (step S16). When the user inputs the authentication information to the log-in screen, the reception unit 12 receives the input of the authentication information (step S17). In this case, the user of "Alice" inputs his or her user identification information (user ID or user name) and password, and the reception unit 12 receives the input user identification information and password as the authentication information.

Next, the transmission/reception unit 11 transmits the authentication information input to the log-in screen in step S17 to the authorization server 70 (step S18). Accordingly, the transmission/reception unit 71 of the authorization server 70 receives the authentication information transmitted from the communication terminal 10A. Next, the authentication unit 72 of the authorization server 70 searches the authentication information management DB 7001 (see FIG. 11) using the user ID and the password included in the authentication information received in S18 as search keys. Then, the authentication unit 72 performs authentication processing by determining whether the same pair of the user ID and the password is stored in the authentication information management DB 7001 or not (step S19). In the following, a case in which the authentication unit 72 determines that the user "Alice" is a user who has a legitimate use authority is described.

Next, the transmission/reception unit 71 of the authorization server 70 transmits an authentication success notification indicating that the authentication for the user "Alice" indicates successful to the communication terminal 10A that is a transmission source of the authentication information (step S20). Accordingly, the transmission/reception unit 11 of the communication terminal 10A receives the authentication success notification transmitted from the authorization server 70.

Next, the transmission/reception unit 11 of the communication terminal 10A participates in the authenticated event by communicating with the management server 50 (step S21). When the event is started, the communication terminal 10A displays an event screen 200, which is described later, via a browser.

In addition, the authorization processing unit 53 of the management server 50 transmits, to the authorization server 70, an authorization token acquisition request for requesting to acquire an authorization token (access token) for the external storage 90 of the user "Alice" who has participated in the event (step S22). Accordingly, the transmission/reception unit 71 of the authorization server 70 receives the authorization token acquisition request transmitted from the management server 50. Then, the authorization server 70 transmits the authorization token for the external storage 90 of the user "Alice" and the user identification information for identifying the user "Alice" to the management server 50 that is a request source (step S23). Accordingly, the authorization processing unit 53 of the management server 50 receives the authorization token and the user identification information transmitted from the authorization server 70.

Then, the storing/reading unit 59 of the management server 50 stores, in the user information management DB 5001, the user information in which the authorization token and the user identification information, which are received in step S23, are associated with each other (step S23).

As described above, the communication system 1 performs authentication processing for a user being to participate in an event by using the management system 5, and stores an authorization token (access token) for external storage of the authenticated user. When an event is started, a device such as the image capturing device 30 starts an application in response to a request from the management server 50 and directly communicates with the management server 50, thereby participating in the event.

Figure 13:
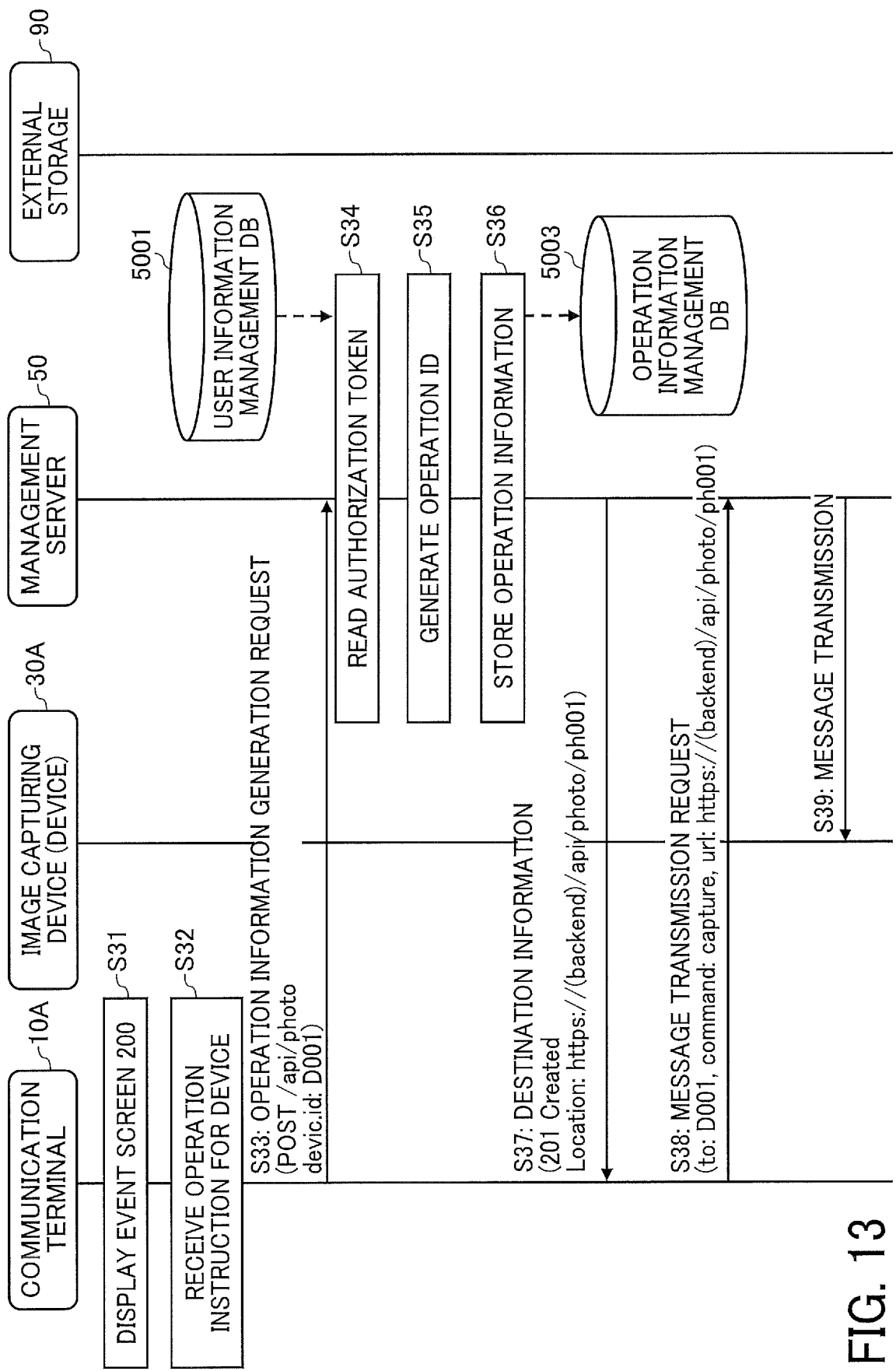
FIG. 13 is a sequence diagram illustrating an example of a process of uploading a file to external storage according to the one of the embodiments of the disclosure.
Figure 14:
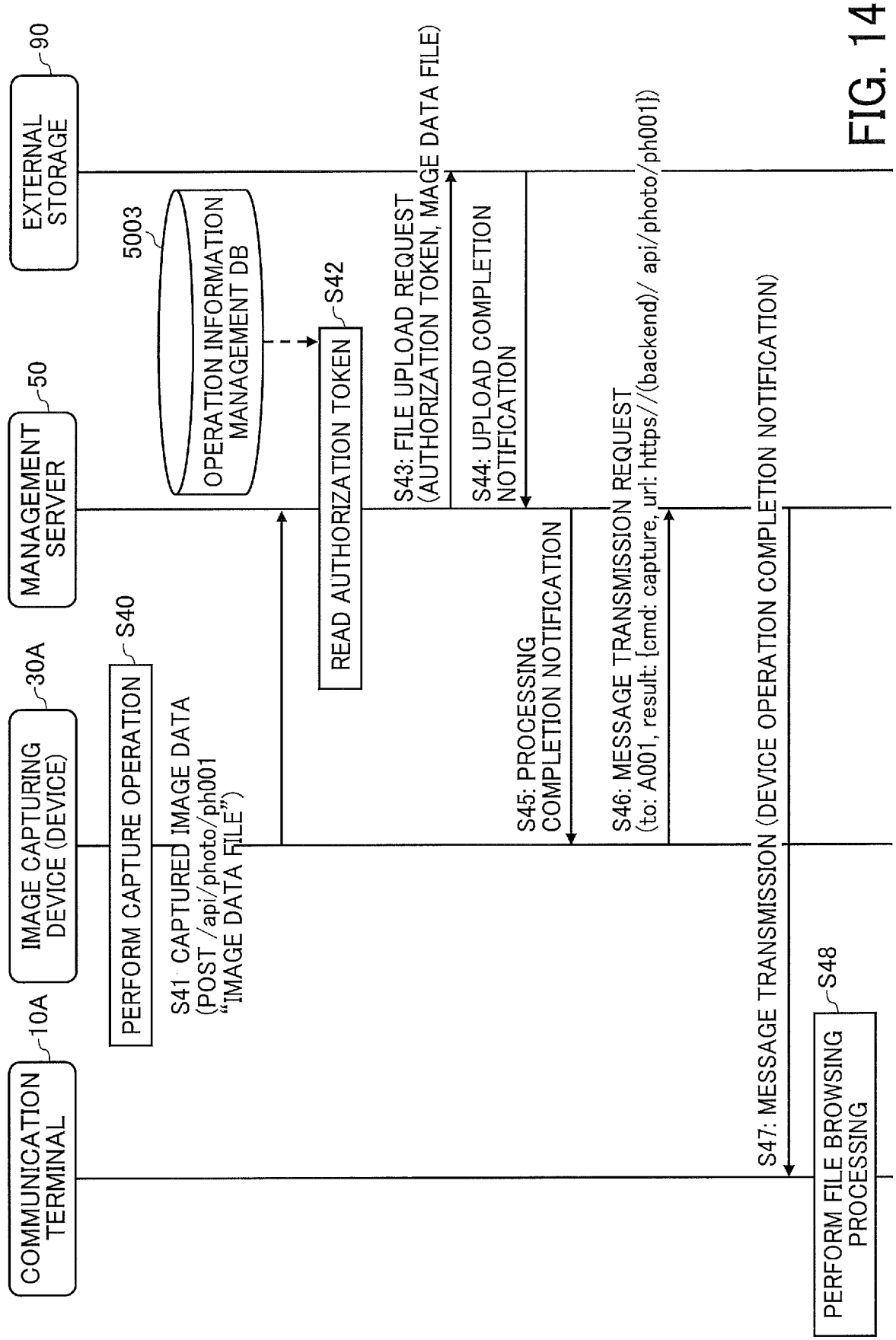
FIG. 14 is a sequence diagram illustrating another example of a process of uploading a file to external storage according to the one of the embodiments of the disclosure.

File Upload:

Next, reference to FIG. 13 to FIG. 17, a process of uploading an image captured by the image capturing device 30, which is an example of a device, to external storage in response to a request from a communication terminal 10A participating in an event is described. FIG. 13 and FIG. 14 are sequence diagrams each illustrating an example of a process of uploading a file to external storage according to the present embodiment. In the following description of the example, the communication terminal 10A participates in a remote inspection for a site where the image capturing device 30 is installed, by the authentication process for the user "Alice" illustrated in FIG. 12. The remote inspection is an example of an event. It is assumed that a plurality of image capturing devices 30 (for example, an image capturing device 30A and an image capturing device 30B) and another communication terminal 10 (for example, a communication terminal 10B) also participate in the event in which the communication terminal 10A participates. Each of the communication terminals 10 and the image capturing devices 30 participating in the event transmits and receives a captured image (image) captured or obtained at each site via the management server 50.

Figure 15:
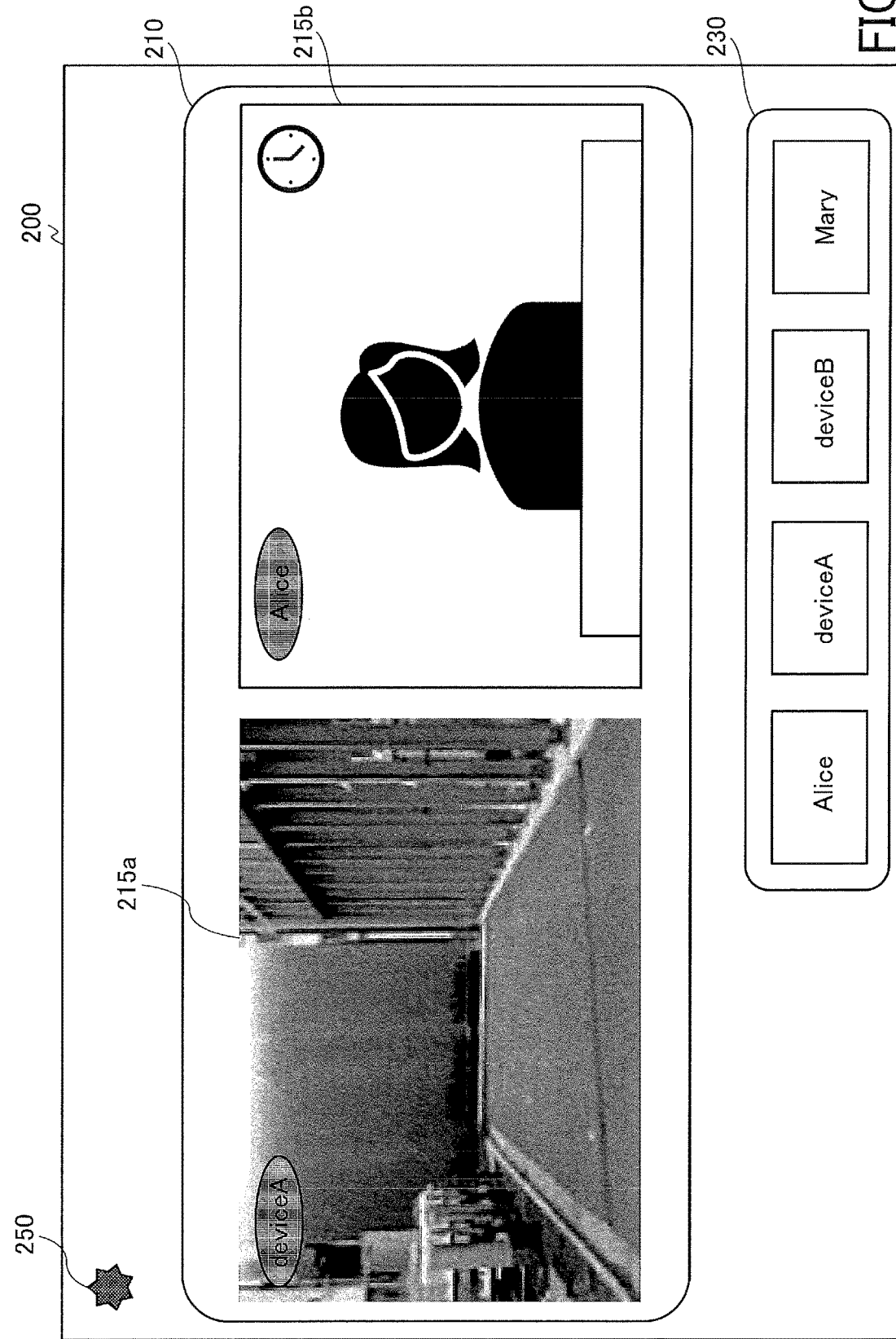
FIG. 15 is a diagram illustrating an example of an event screen, according to the one of the embodiments of the disclosure.
Figure 16:
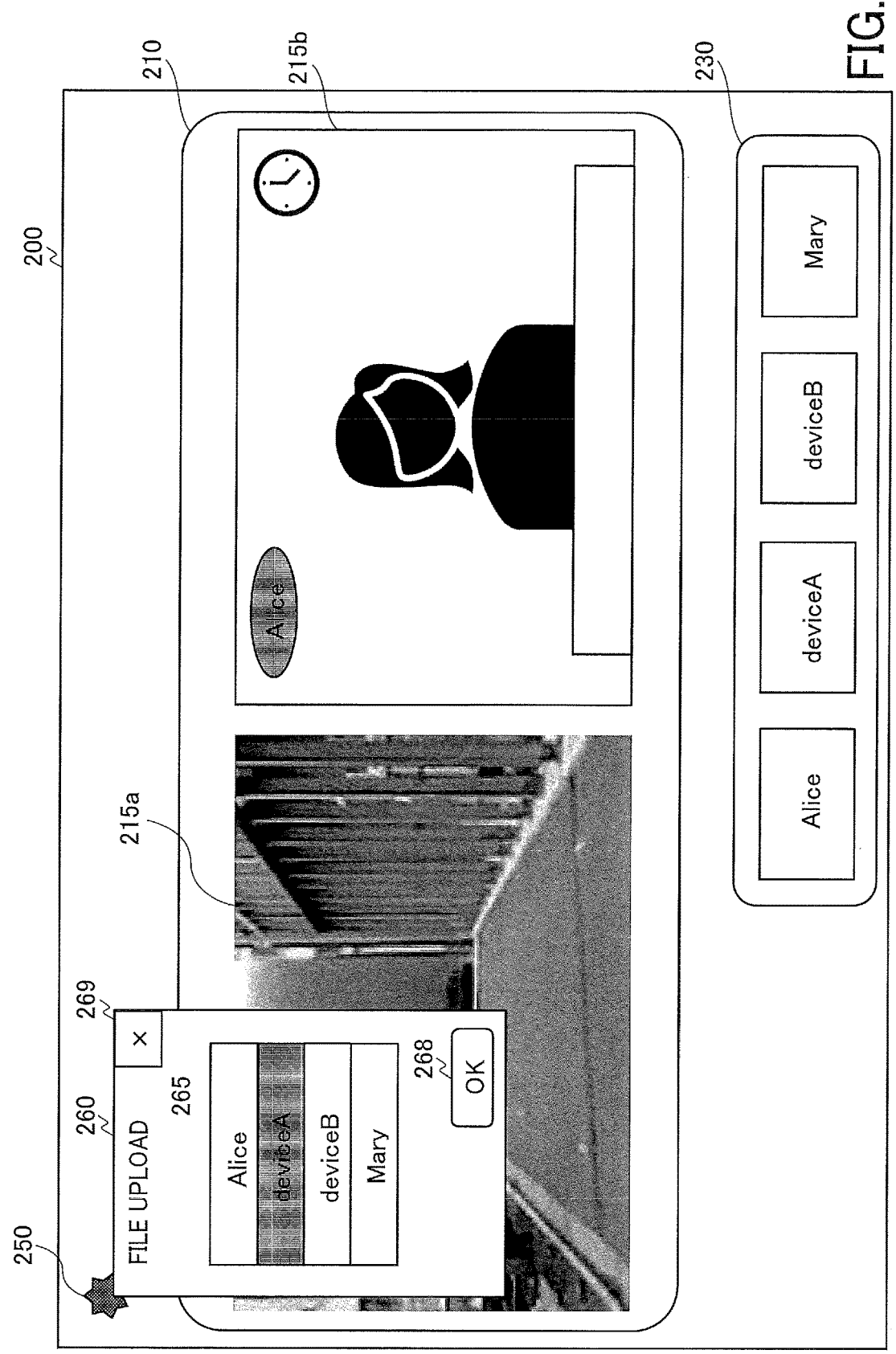
FIG. 16 is a diagram illustrating another example of an event screen, according to the one of the embodiments of the disclosure.

First, the display control unit 13 of the communication terminal 10A causes the display 106 to display an event screen 200 by participating in the event after the authentication processing illustrated in FIG. 12. FIG. 15 and FIG. 16 are diagrams each illustrating an example of the event screen, according to the present embodiment. The event screen 200 illustrated in FIG. 15 is a display screen displayed in the event implemented by remote communication via the management server 50 between the communication terminals 10 used by each user who is an event participant and each device such as the image capturing device 30 which is a participant of the event. The event screen 200 includes a site image display area 210 for displaying a captured image (image) of each site that participates in the event, a participant display area 230 for displaying participants who participate in the event, and an operation request button 250 that is pressed when a device operation is requested.

The site image display area 210 includes the captured image (image) of each site captured or obtained by a device such as the communication terminal 10 used by the user participating in the event or the image capturing device 30 participating in the event. In the example illustrated in FIG. 15, in the site image display area 210, a captured image 215a captured or obtained by the image capturing device 30A that is a "device A" and a captured image 215b captured or obtained by the communication terminal 10A used by the user "Alice" are displayed. The participant display area 230 includes information indicating a participant name (a user name or a device name) that indicates a participant who participates in the event or information with which a participant is identifiable, such as an icon indicating a participant. In the example of FIG. 15, the participant display area 230 indicates that the user "Alice," "device A," "device B," and a user "Mary" are participating in the event.

In the example of FIG. 15, the number of captured images of participants displayed in the site image display area 210 are two, but the number of captured images displayed in the site image display area 210 is not limited to this. For example, the site image display area 210 may display captured images of all participants participating in the event, or may display a captured image of a participant whose user name or the like displayed in the participant display area 230 is selected by the user.

Next, when the user presses the operation request button 250 on the event screen 200, the reception unit 12 receives an operation instruction to a device such as the image capturing device 30 (step S32). More specifically, when the user presses the operation request button 250, the display control unit 13 displays a device selection screen 260 as illustrated in FIG. 16. The device selection screen 260 is a display screen for selecting a device (receiving a selection of a device) for executing a capturing operation for a captured image to be uploaded as an image data file of captured image data to the external storage 90. The capturing operation is an example of the device operation. The device selection screen 260 includes a selection area 265 for selecting a device to which a device operation is to be instructed, an "OK" button 268 that is pressed to execute an operation instruction to a device, and a "close" button 269 that is pressed when an operation instruction to a device is canceled or stopped. When a user selects a user name or a device name displayed in the selection area 265 and presses the "OK" button 268, the reception unit 12 receives an operation instruction to the selected device.

In the description of the example, in the selection area 265, not only devices such as the image capturing devices 30 but also the user "Alice" and the user "Mary" are displayed in a selectable manner. The communication terminal 10 used by the user other than the user "Alice" who uses the communication terminal 10A may be regarded as a device in the same way as the image capturing device 30. That is, a device in a broad sense according to the present embodiment includes a terminal or an apparatus that is not authenticated by a user who performs an operation instruction.

In the example illustrated in FIG. 16, a state in which the user has selected the image capturing device 30A that is "device A." An example case in which a device operation request is issued to the image capturing device 30A in response to an operation instruction from the user "Alice" is described below.

The transmission/reception unit 11 transmits, to the management server 50, an operation information generation request for requesting to generate operation information related to an operation requested to the image capturing device 30A (step S33). The operation information generation request includes the user identification information (user ID or user name) of the authenticated user, the device identification information (device ID or device name) for identifying the image capturing device 30A in relation to which the request has been received in step 32, and information indicating content of an operation to be executed by the image capturing device 30A. The operation information generation request is, for example, a request to generate operation information related to an operation corresponding to a capturing request for the image capturing device 30A to capture a captured image. Accordingly, the transmission/reception unit 51 of the management server 50 receives the operation information generation request transmitted from the communication terminal 10A.

Next, the storing/reading unit 59 of the management server 50 searches the user information management DB 5001 (see FIG. 8) using the user identification information received in step S33 as a search key, thereby reading an authorization token (access token) associated with the received user identification information (step S34). Next, the operation information generation unit 54 generates an operation ID for specifying an operation to be executed by the image capturing device 30 (step S35). In addition, the operation information generation unit 54 generates operation information in which the device identification information received in step S33, the authorization token read in step S34, and the operation ID generated in step S35 are associated with each other. Then, the operation information generation unit 54 stores the generated operation information in the operation information management DB 5003 (see FIG. 10) via the storing/reading unit 59 (step S36). As described above, the management server 50 stores the authorization token for accessing the external storage 90 of the user in association with the operation ID so that the authorization token may be used in processing in a subsequent step.

Next, the transmission/reception unit 51 transmits, to the communication terminal 10A, address information indicating a temporary storage destination of data for transferring an operation result from the image capturing device 30A (step S37). The address information is uniquely specified for each device operation corresponding to the device operation request received in step S32. The address information is, for example, a URL indicating an address on the management server 50. Accordingly, the transmission/reception unit 11 of the communication terminal 10A receives the address information transmitted from the management server 50.

Next, the transmission/reception unit 11 of the communication terminal 10A transmits, to the management server 50, a message transmission request requesting to transmit a message to the image capturing device 30A (step S38). The message transmission request includes a device ID (D001) for identifying the image capturing device 30A to which the message is to be transmitted, an operation command for requesting the image capturing device 30A, and the address information received in step S37. Accordingly, the transmission/reception unit 51 of the management server 50 receives the message transmission request transmitted from the communication terminal 10A.

Next, the message processing unit 55 of the management server 50 transmits the message (an example of a first message) corresponding to the message transmission request received in step S38 to the image capturing device 30A identified by the device ID indicated in the received message transmission request (step S39). The message includes the operation command and the address information included in the message transmission request received in step S38. Accordingly, the transmission/reception unit 31 of the image capturing device 30A receives the message transmitted from the management server 50.

Next, the image capturing device 30A performs processing based on the operation command indicated in the message received in step S39 (step S40). In this case, since the received operation command is "capturing," the image capturing device 30A performs image capturing processing by the imaging control unit 33.

Next, the transmission/reception unit 31 of the image capturing device 30A transmits an image data file corresponding to captured image data acquired by the processing of step S40 to the management server 50, by using the address information indicated in the message received in step S39 (step S41). Accordingly, the transmission/reception unit 51 of the management server 50 receives the image data file transmitted from the image capturing device 30A.

Next, the storing/reading unit 59 of the management server 50 reads the access token (access token) associated with the operation ID generated in step 35 from the operation information management DB 5003 (step S42). Then, the upload processing unit 56 transmits a file upload request to the external storage 90 (step S43). The file upload request includes the authorization token read in step S42 and the image data file received in step S41.

The external storage 90 performs authentication processing using the authorization token transmitted from the management server 50. Since the authorization token corresponds to the user "Alice," the authorization token is authenticated using the authentication information of "Alice." Then, the external storage 90 stores the image data file transmitted from the management server 50 in a folder associated with the authenticated user "Alice."

Then, the external storage 90 transmits an upload completion notification to the management server 50 (step S44). Accordingly, the transmission/reception unit 51 of the management server 50 receives the upload completion notification transmitted from the external storage 90.

Next, the transmission/reception unit 51 of the management server 50 transmits a processing completion notification to the image capturing device 30A that has transmitted the image data file in step S41 (step S45). Accordingly, the transmission/reception unit 31 of the image capturing device 30A receives the processing completion notification transmitted from the management server 50.

Next, the transmission/reception unit 31 of the image capturing device 30A transmits, to the management server 50, a message transmission request requesting to transmit a message to the communication terminal 10A (step S46). The message transmission request includes the operation command and the address information included in the message received in step S39, and information indicating that the device operation has been completed. Accordingly, the transmission/reception unit 51 of the management server 50 receives the message transmission request transmitted from the image capturing device 30A.

Next, the message processing unit 55 of the management server 50 transmits the message, which indicates the completion of the image data file upload by the image capturing device 30A, (an example of a second message) corresponding to the message transmission request received in step S46 to the communication terminal 10A used by the user "Alice" who is identified by the user ID indicated with the received message transmission request (step S47). Accordingly, the transmission/reception unit 11 of the communication terminal 10A receives the message transmitted from the management server 50. Then, the communication terminal 10A displays, according to the received message, a predetermined display screen indicating that the upload has been completed to notify the user "Alice" of the completion of the requested operation.

Figure 17:
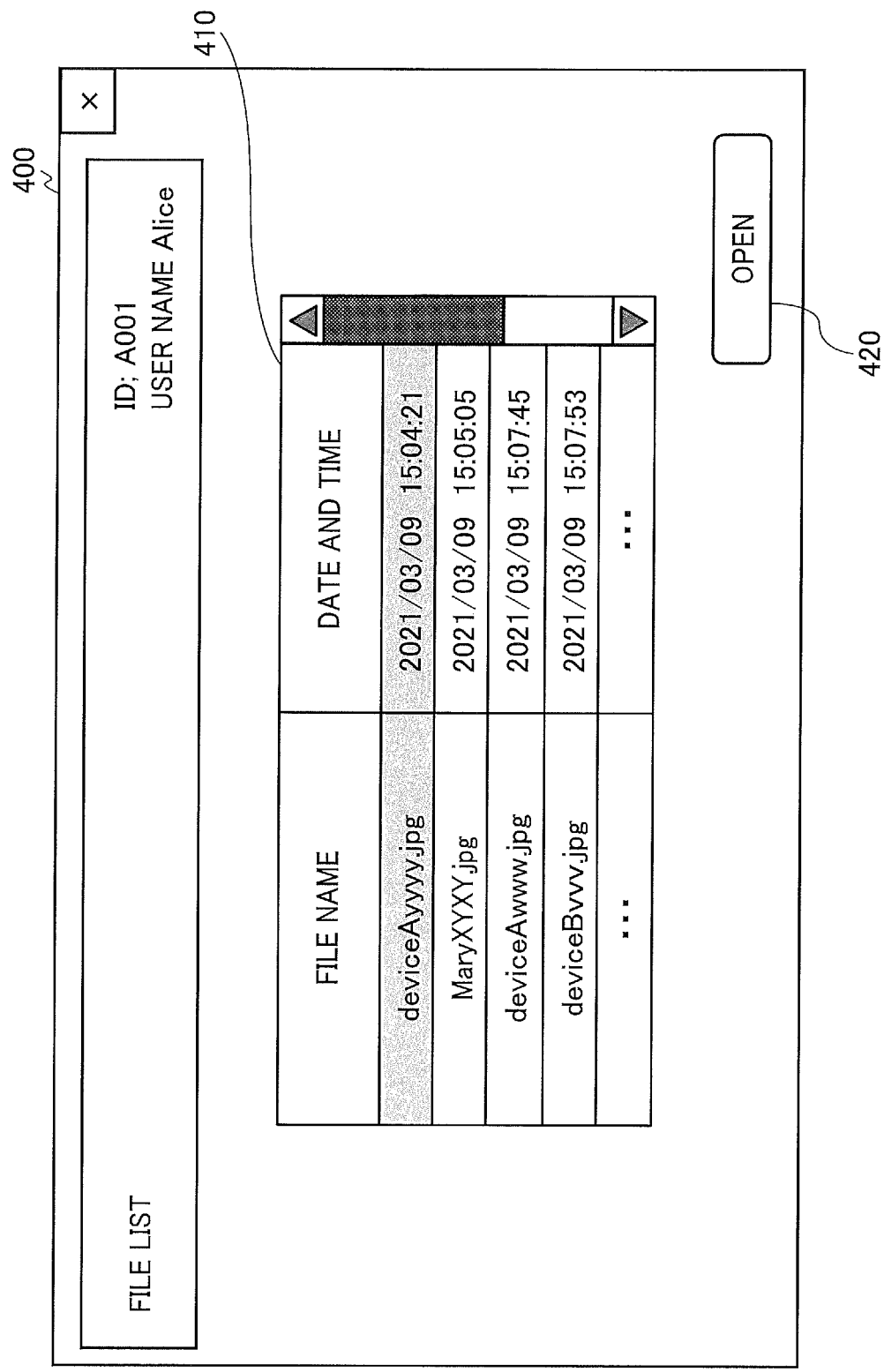
FIG. 17 is a diagram illustrating an example of a file browsing screen according to the one of the embodiments of the disclosure.

In addition, the communication terminal 10A accesses the external storage 90 with the access authority of the user "Alice" to perform browsing processing for the uploaded file (step S48). FIG. 17 is a diagram illustrating an example of a file browsing screen, according to the present embodiment. The display control unit 13 of the communication terminal 10A accesses the external storage 90 with the access authority of the user "Alice," thereby causing the display 106 to display a file browsing screen 400 illustrated in FIG. 17.

The file browsing screen 400 includes a list display area 410 that indicates a list of data files (file list) uploaded to the folder of the user "Alice" in the external storage 90, and an "OPEN" button 420 that is pressed when content of the uploaded file is viewed. The list display area 410 includes a file name of an uploaded data file and a date and time when the data file is uploaded.

When the user "Alice" selects a data file indicated in the list display area 410 and presses the "OPEN" button 420, the display control unit 13 displays the selected data file. In the example illustrated in FIG. 17, a state in which the uploaded file "deviceAyyyy.jpg" is selected is indicated.

As described above, in response to a device operation request from a user who participates in an event, the communication system 1 temporarily stores an authorization token for the external storage 90 of the user in the management server 50. Then, the management server 50 uploads data acquired by a requested device operation to the external storage 90 corresponding to the user using the temporarily saved authorization token.

As described above, with the communication system 1, data acquired by a device is uploaded to the external storage 90 to which the user has authority by merely selecting a device participating in an event, resulting in reduction of time and effort in upload processing for a user.

In addition, with the communication system 1, data acquired by the device is directly uploaded to the external storage 90 of the user without performing a device operation by the user and user authentication with the device. Accordingly, upload processing is performed without passing access information such as an authorization token of the user of the external storage 90 to the device.

As described above, the management system 5 according to an embodiment of the disclosure manages a predetermined event executed by communication between the communication terminal 10 used by a user and a device (for example, the image capturing device 30) that performs remote communication with the communication terminal 10. The management system 5 receives an operation request for a specific device transmitted from a communication terminal 10 used by the user who is authenticated by the management system 5 and stores operation identification information for identifying a device operation associated with the received operation request and an authorization token (an example of access information) associated with the user for accessing external storage 90 in association with each other. Then, the management system 5 uploads data acquired by the specific device according to the device operation corresponding to the operation identification information to the external storage 90 using the authorization information associated with the operation identification information. This allows the management system 5 to reduce processing time and effort when uploading data acquired by a device to external storage with user authority.

In addition, the management system 5 according to an embodiment of the disclosure generates operation information based on the received operation request to be stored. The operation information includes the operation identification information, the access information, and device identification information identifying the specific device in association with each other. In addition, the management system 5 transmits address information (for example, a URL) to be used to transfer the data acquired according to the device operation associated with the received operation request, and transmits a first message to the specific device in response to a message transmission request including the address information. The message transmission request is transmitted from the communication terminal 10 and is a request to transmit the first message to the specific device. In addition, the management system 5 receives from the specific device, the data acquired according to the device operation according to the transmitted first message, and uploads the received data to the external storage 90 using the stored authorization token. As described above, the management system 5 directly uploads data acquired by the device to the external storage 90 of the user without performing a device operation by the user and user authentication with the device. Accordingly, upload processing is performed without passing access information such as an authorization token of the user of the external storage 90 to the device.

Further, the communication system according to an embodiment of the disclosure includes the management system 5 and the communication terminal 10. The communication terminal 10 displays a captured image captured, or obtained, by a device (for example, the image capturing device 30) installed at a remote site on the display 106 (an example of a display unit), receives a selection of a specific device to which a capturing request with respect to the displayed captured image is instructed, and transmits an operation request associated with the received specific device to the management system 5. As described above, the communication system 1 uploads data acquired by a device to the external storage 90 to which the user has authority by merely selecting a device participating in an event, resulting in reduction of time and effort in upload processing for a user.

Further, in the communication system according to an embodiment of the present disclosure, the communication terminal 10 causes the display 106 (an example of a display unit) to display a browsing screen (an example of a file browsing screen 400) corresponding to the data uploaded to the external storage 90 based on the authorization token (an example of access information) of a user authenticated by the management system 5. As a result, with the communication system 1, the data directly uploaded from a device is browsed and viewed, when a user having access authority accesses the external storage 90.

In a conventional method, in a case where data acquired by a device such as an image capturing device or an electronic whiteboard that is participating in an event such as a remote communication is uploaded to external storage with user authority, processing including user authentication with the device occurs, and the processing takes time and effort.

According to one or more embodiments of the present disclosure, time and effort taken by processing in uploading data acquired by a device to external storage with user authority is reduced.

Each of the functions of the above-described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

Each of the tables of the above-described embodiments may be generated by learning effect of machine learning. In addition, in alternative to using the tables, the data of each related item may be classified by the machine learning. In the present disclosure, the machine learning is defined as a technology that makes a computer to acquire human-like learning ability. In addition, the machine learning refers to a technology in which a computer autonomously generates an algorithm used for determination such as data identification from learning data loaded in advance and applies the generated algorithm to new data to make a prediction. Any suitable learning method is applied for the machine learning, for example, any one of supervised learning, unsupervised learning, semi-supervised learning, reinforcement learning, and deep learning, or a combination of two or more of these learning.

Although the management system, the communication system, the processing method, and the program according to one or more embodiments of the present disclosure have been described above, the present disclosure may be modified within the scope of those skilled in the art, such as other embodiments, additions, modifications, deletions, etc., and as long as effects of the present disclosure are exhibited in any of the embodiments, the embodiments are included in the scope of the present disclosure.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The invention claimed is:

1. A management system for managing an event executed between a communication terminal used by a user and one or more devices, the management system comprising
circuitry configured to:
receive an operation request for a device of the one or more devices from the communication terminal;
generate operation information associated with operation identification information and access information, the operation identification information identifying a device operation corresponding to the operation request, the access information being associated with the user and used to access external storage; and
upload data acquired by the device according to the device operation to the external storage using the access information associated with the generated operation information.

2. The management system of claim 1, wherein
the operation request is a capturing request to capture a captured image obtained by the device, and
the circuitry uploads, to the external storage, the data that is captured image data acquired according to the device operation.

3. A communication system comprising:
a management system configured to manage an event executed between a communication terminal used by a user and one or more devices; and
a communication terminal including communication terminal circuitry configured to transmit an operation request for a device of the one or more devices to the management system,
wherein the management system includes:
circuitry configured to:
generate operation information associated with operation identification information and access information, the operation identification information identifying a device operation related to the operation request from the communication terminal, the access information being associated with the user and used to access external storage; and
upload data acquired by the device according to the device operation to the external storage using the access information associated with the generated operation information.

4. An information processing method of managing an event executed between a communication terminal used by a user and one or more devices, the information processing method comprising:
receiving an operation request for a device of the one or more devices from the communication terminal;
generating operation information associated with operation identification information and access information, the operation identification information identifying a device operation corresponding to the operation request, the access information being associated with the user and used to access external storage; and
uploading data acquired by the device according to the device operation to the external storage using the access information associated with the generated operation information.

5. An information processing method performed by a communication system including: a management system configured to manage an event executed between a communication terminal used by a user and one or more devices; and a communication terminal including communication terminal circuitry configured to transmit an operation request for a device of the one or more devices to the management system, wherein the management system includes: circuitry configured to: generate operation information associated with operation identification information and access information, the operation identification information identifying a device operation related to the operation request from the communication terminal, the access information being associated with the user and used to access external storage; and upload data acquired by the device according to the device operation to the external storage using the access information associated with the generated operation information, the information processing method comprising:

transmitting, by the communication terminal, an operation request for a device of the one or more devices to the management system;
generating, by the management system, operation information associated with operation identification information and access information, the operation identification information identifying a device operation corresponding to the operation request, the access information being associated with the user and used to access external storage; and
uploading, by the management system, data acquired by the device according to the device operation to the external storage using the access information associated with the generated operation information.

\* \* \* \* \*